(12) United States Patent
Moor

(10) Patent No.: US 12,066,339 B2
(45) Date of Patent: Aug. 20, 2024

(54) SYSTEM AND METHOD OF DETECTING FORCE APPLIED TO AN OBJECT USING PRESSURE-SENSITIVE SHEETS

(71) Applicant: HP1 TECHNOLOGIES LIMITED, Leeds (GB)

(72) Inventor: Tim Moor, Leeds (GB)

(73) Assignee: HP1 TECHNOLOGIES LIMITED, Leeds (GB)

( * ) Notice: Subject to any disclaimer, the term of this patent is extended or adjusted under 35 U.S.C. 154(b) by 0 days.

(21) Appl. No.: 17/597,767

(22) PCT Filed: Jul. 23, 2020

(86) PCT No.: PCT/GB2020/051761
§ 371 (c)(1),
(2) Date: Jan. 21, 2022

(87) PCT Pub. No.: WO2021/014158
PCT Pub. Date: Jan. 28, 2021

(65) Prior Publication Data
US 2022/0268647 A1 Aug. 25, 2022

(30) Foreign Application Priority Data
Jul. 23, 2019 (GB) ..................... 1910547

(51) Int. Cl.
*G01L 1/18* (2006.01)
(52) U.S. Cl.
CPC ..................... *G01L 1/18* (2013.01)
(58) Field of Classification Search
CPC ... G01L 1/18; G01L 1/205; G01L 7/08; G01L 1/2287; G01L 1/2293
See application file for complete search history.

(56) References Cited

U.S. PATENT DOCUMENTS 6,360,612 B1 3/2002 Trantzas
6,917,104 B2 * 7/2005 Hashimoto ......... G02F 1/13452
257/781

(Continued)

FOREIGN PATENT DOCUMENTS

CN 107063534 A 8/2017
CN 108369464 A 8/2018

(Continued)

OTHER PUBLICATIONS

Khan et al. "Pressure Sensors Based on Screen-Printed P(VDF-TrFE) and P(VDF-TrFE) MWCNTs," in IEEE Transactions on Semiconductor Manufacturing, vol. 28, No. 4, pp. 486-493, Nov. 2015.

(Continued)

*Primary Examiner* — Tran M. Tran
(74) *Attorney, Agent, or Firm* — ARENTFOX SCHIFF LLP

(57) ABSTRACT

A pressure-sensitive sheet for detecting a force applied to an object, the sheet comprising: a first substrate having a first electrical connection region and a first electrode region thereon, the first electrical connection region being electrically connected to the first electrode region; a second electrical connection region and a second electrode region, the second electrical connection region being electrically connected to the second electrode region, the second electrode region being physically separated from the first electrode region; a pressure-sensitive layer arranged between the first electrode region and the second electrode region to provide an electrical connection therebetween, the pressure-sensitive layer being arranged to change electrical resistance in response to pressure changes, wherein the first electrical connection region and the second electrical connection region are arranged along different edge regions of the (Continued)

pressure-sensitive sheet to provide circuit terminals of the first electrode and the second electrode respectively.

14 Claims, 18 Drawing Sheets

(56) References Cited

U.S. PATENT DOCUMENTS

| | | | |
|---|---|---|---|
| 7,430,925 B2* | 10/2008 | Son | G01L 1/205 |
| | | | 73/862.046 |
| 8,966,997 B2* | 3/2015 | Taylor | G01L 5/00 |
| | | | 73/862.041 |
| 9,500,552 B2* | 11/2016 | Williams | G01L 1/205 |
| 10,048,140 B2* | 8/2018 | Choi | G01L 1/18 |
| 10,350,764 B2* | 7/2019 | Ibrocevic | G01L 1/2268 |
| 10,401,241 B2* | 9/2019 | Madden | G06F 3/04144 |
| 11,269,440 B1* | 3/2022 | Fang | G06F 3/04166 |
| 11,391,639 B2* | 7/2022 | Li | G01L 1/18 |
| 11,435,248 B2* | 9/2022 | Viberg | G01L 9/02 |
| 11,454,563 B2* | 9/2022 | Marsh | G01L 19/00 |
| 11,480,481 B2* | 10/2022 | McMillen | G01L 1/18 |
| 11,493,392 B2* | 11/2022 | Kondoh | G01L 1/26 |
| 11,630,007 B2* | 4/2023 | Kim | H01C 17/0658 |
| | | | 73/862.627 |
| 11,680,968 B2* | 6/2023 | Thompson | G01L 1/146 |
| | | | 324/123 R |
| 11,740,143 B2* | 8/2023 | Fu | D06M 11/83 |
| | | | 73/862.59 |
| 2008/0093687 A1 | 4/2008 | Antaki | |
| 2012/0055257 A1 | 3/2012 | Shaw-Klein | |
| 2012/0120009 A1 | 5/2012 | Lussey et al. | |
| 2013/0042702 A1* | 2/2013 | Huang | G01L 1/18 |
| | | | 73/862.625 |
| 2013/0303946 A1 | 11/2013 | Gettens et al. | |
| 2014/0090489 A1 | 4/2014 | Taylor | |
| 2014/0130593 A1* | 5/2014 | Ciou | A61B 5/1038 |
| | | | 73/172 |
| 2016/0370210 A1* | 12/2016 | Kapusta | G01K 7/16 |
| 2018/0117772 A1* | 5/2018 | Ikebe | G01L 1/2287 |
| 2019/0142097 A1 | 5/2019 | Moor | |
| 2021/0169419 A1* | 6/2021 | Oren | B32B 9/041 |
| 2021/0181042 A1* | 6/2021 | Chu | H01L 29/84 |
| 2022/0136914 A1* | 5/2022 | Kim | G01L 1/205 |
| | | | 338/47 |
| 2022/0187145 A1* | 6/2022 | Kinjo | G01L 1/146 |
| 2022/0268646 A1* | 8/2022 | ChiouChang | G01L 1/005 |
| 2022/0373416 A1* | 11/2022 | Viberg | G01L 1/205 |
| 2022/0412818 A1* | 12/2022 | Hofmann | G01L 1/18 |

FOREIGN PATENT DOCUMENTS

| | | |
|---|---|---|
| CN | 108885515 A | 11/2018 |
| CN | 109688859 A | 4/2019 |
| GB | 2348958 A | 10/2000 |
| JP | H11118635 A | 4/1999 |
| JP | 6325289 A | 9/2015 |
| JP | 2015169532 A | 9/2015 |
| KR | 101528291 B1 | 6/2015 |
| WO | 2008046123 A2 | 4/2008 |

OTHER PUBLICATIONS

Examination Report dated Aug. 30, 2022 issued in corresponding GB Application No. GB1910547.7.
International Search Report and Written Opinion dated Nov. 19, 2020 issued in corresponding PCT Application No. PCT/GB2020/051761.
Office Action in CN202080066660.3, mailed Sep. 15, 2023, 11 pages.

* cited by examiner

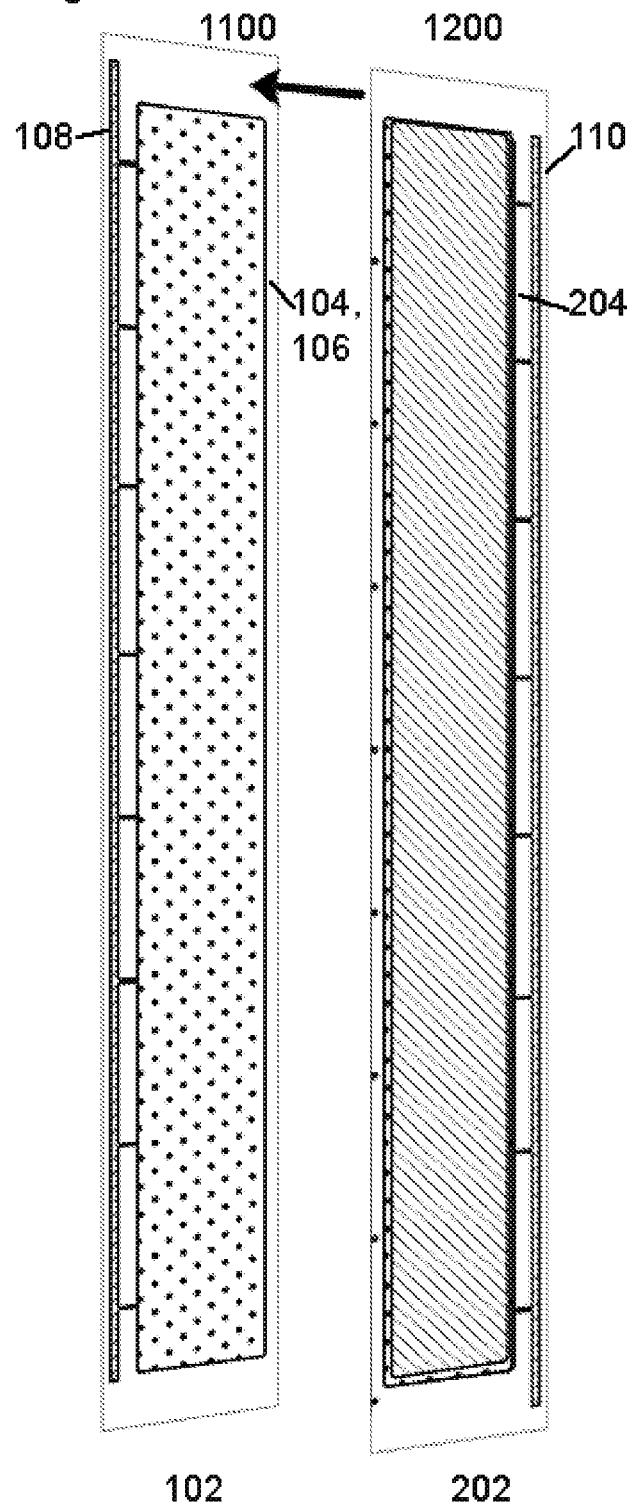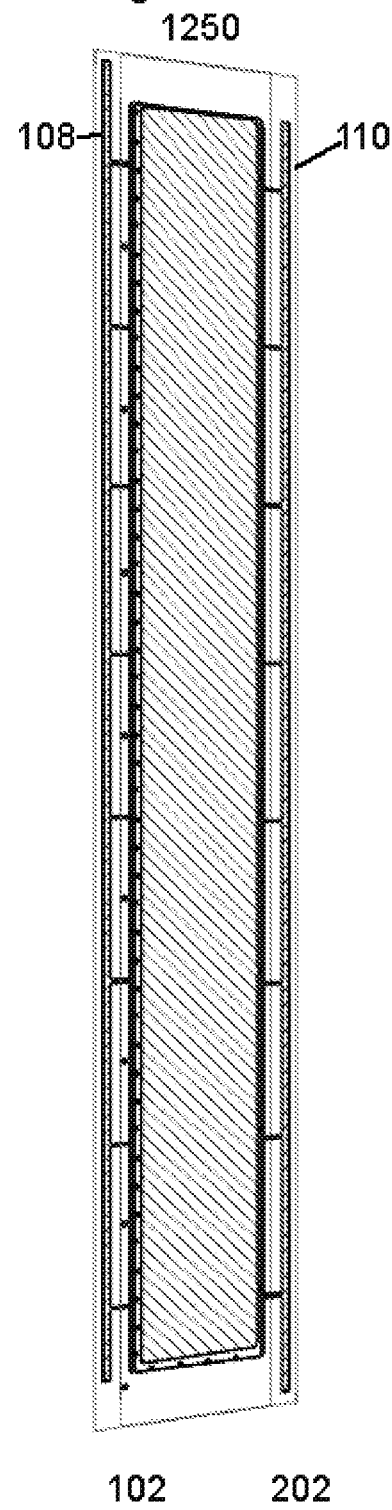

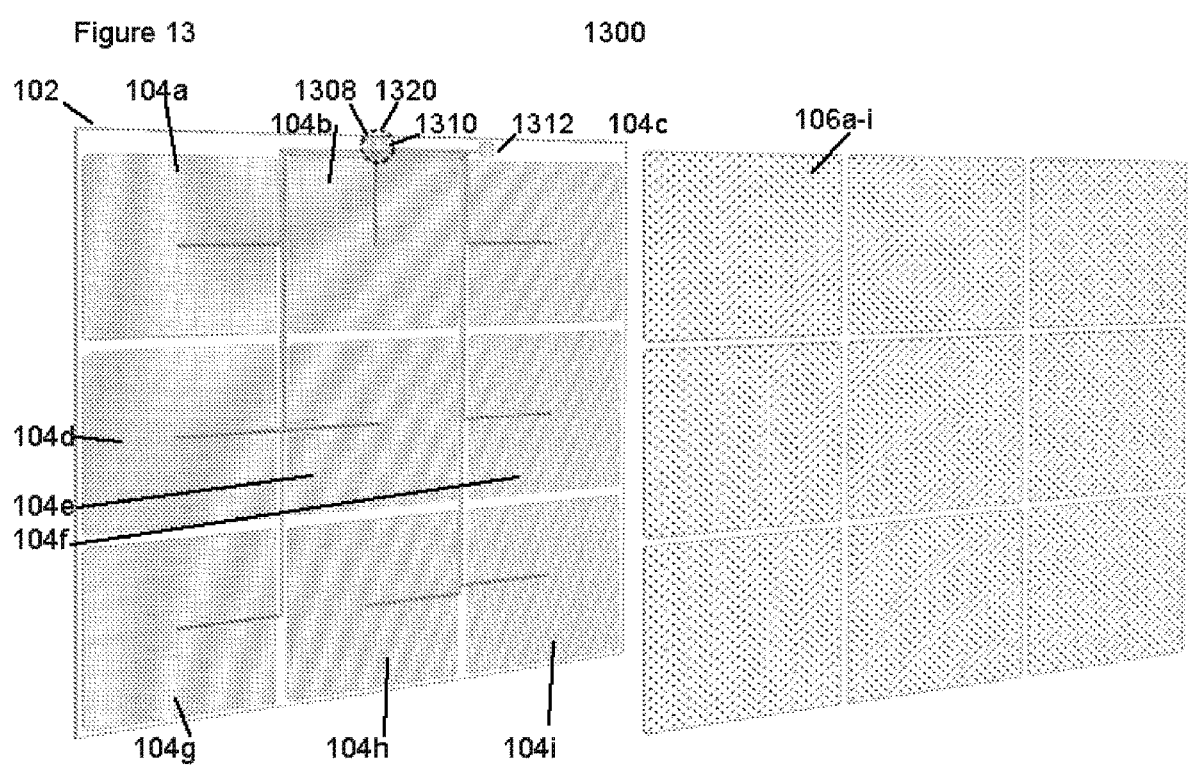

Figure 20
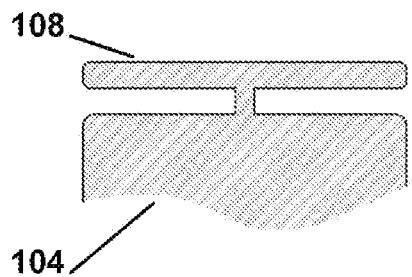
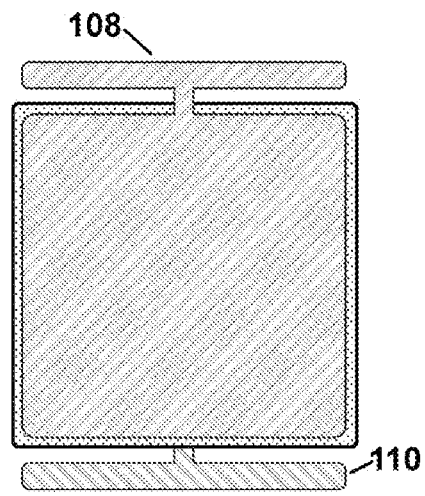
Figure 21
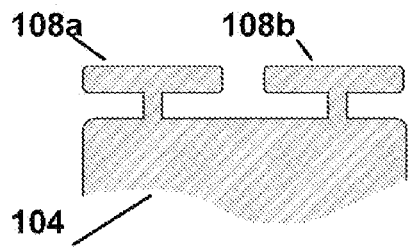
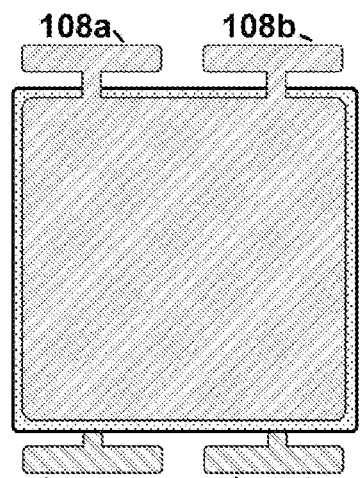
Figure 22
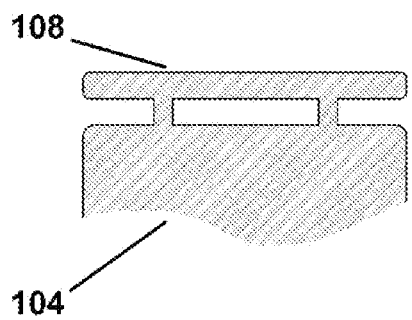
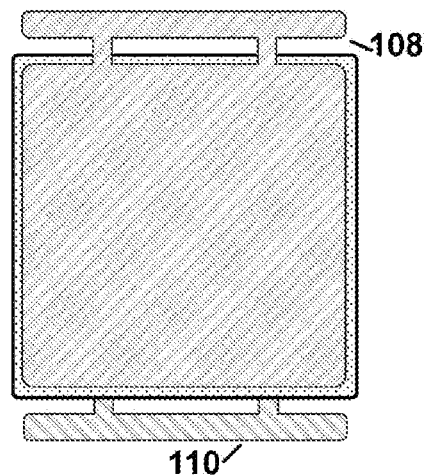

2300

2400

2500

SYSTEM AND METHOD OF DETECTING FORCE APPLIED TO AN OBJECT USING PRESSURE-SENSITIVE SHEETS

CROSS-REFERENCE TO RELATED APPLICATIONS

This application is a National Phase of PCT Application No. PCT/GB2020/051761, filed Jul. 23, 2020, which claims priority to British Patent Application No. 1910547.7, filed Jul. 23, 2019, the disclosures of which are hereby incorporated by reference in their entireties.

FIELD

The invention relates to a pressure-sensitive or force-sensitive sheet for detecting a force applied to an object, and a modular system including such a pressure-sensitive sheet.

BACKGROUND

Pressure or force-sensing technology has been introduced into a variety of fields, such as footfall or intruder detection, as well as in sports or as wearable objects in general for detecting forces experienced by a wearer. Known technology applies a variety of methods to detect these forces, including trigger switches, mechanical switches, and other means.

One example technology is disclosed in WO2017/198990, in the name of HP1 Technologies Limited, discloses a device for detecting a force or pressure applied to an object. The device comprises a flexible substrate layer having a plurality of pressure sensors thereon. Electrically conductive tracks, on the substrate layer, are arranged to provide an electrical connection to the plurality of pressure sensors. This known device is able to be applied to an object to act as a force sensor for that object.

Increasingly there is a need to be able to detect the forces applied to a larger variety of objects, and to objects of a larger variety of sizes. While the device of WO2017/198990 is useful for its intended purpose, it may not be optimum for use with very large objects in a realistic manner. Indeed, it would be beneficial to be able to detect forces applied over most of the surface of a very large object in a practical manner. It would also be beneficial to provide a device that is able to detect forces applied to objects of almost any shape.

SUMMARY

An invention is defined in the claims. Disclosed herein is a pressure-sensitive sheet for detecting a force applied to an object, the sheet comprising: a first substrate having a first electrical connection region and a first electrode region thereon, the first electrical connection region being electrically connected to the first electrode region; a second electrical connection region and a second electrode region, the second electrical connection region being electrically connected to the second electrode region, the second electrode region being physically separated from the first electrode region; a pressure-sensitive ink arranged between the first electrode region and the second electrode region to provide an electrical connection therebetween, the pressure-sensitive ink being arranged to change electrical resistance in response to pressure changes, wherein the first electrical connection region and the second electrical connection region are arranged along different edge regions of the pressure-sensitive sheet to provide circuit terminals of the first electrode and the second electrode respectively.

Optionally, the different edge regions may be first and second edge regions, the first electrical connection region being located along the first edge region and the second electrical connection region being located along the second edge region.

Optionally, the second electrical connection region and the second electrode region may be located on the first substrate, the second electrode region being spaced apart from the first electrode region.

Optionally, the pressure-sensitive ink may overlap both the first electrode region and the second electrode region.

Optionally, the pressure-sensitive sheet may further comprise a second substrate, wherein the first electrode region and the second electrode region are located between the first substrate and the second substrate.

Optionally, the second electrical connection region may be located on the first substrate and the second electrode region is located on the second substrate, the second electrical connection region being electrically connected to the second electrode region.

Optionally, the second electrical connection region may comprise a tab region positioned to electrically connect with a corresponding tab region of the second electrode region.

Optionally, the first electrical connection region may comprise a plurality of first subregions, the second electrical connection region comprises a plurality of second subregions, and the first electrode region comprises a plurality of first electrode regions, wherein at least one of the first subregions is associated with a first group of the first electrode regions, and wherein at least one of the second subregions is associated with a second group of the first electrode regions, at least some of the first electrodes regions of the first group being different from the first electrode regions of the second group.

Optionally, at least one of the first electrode regions of the first group may be the same as at least one of the first electrode regions of the second group.

Optionally, the second electrical connection region and the second electrode region may both be located on the second substrate, the second electrical connection region being electrically connected to the second electrode region.

Optionally, the second substrate comprises at least one conductive track electrically connecting the second electrical connection region to the second electrode region.

Optionally, at least part of the first electrical connection region and at least part of the second electrical connection region may not be between the first substrate and the second substrate.

Optionally, the first electrical connection region or the second electrical connection region may be arranged to be electrically connected to one of a first or second electrical connection region of another of the pressure-sensitive sheet.

Optionally, the pressure-sensitive sheet may be a strip or tape, the different edge regions being located along the length of the strip or tape.

Optionally, the pressure-sensitive sheet may be substantially rectangular, the different edge regions being located along different edges of the rectangular. The different edges may be opposite edges of the sheet, or the different edges may be adjacent edges of the sheet.

Optionally, the first electrical connection region may comprise two first electrical connection regions located along a first side and a second side of the first substrate respectively, and wherein the second electrical connection region comprises two second electrical connection regions each located along a third side and a fourth side of the first substrate respectively.

Optionally, at least part of both first electrical connection regions and at least part of both second electrical connection regions may not be between the first substrate and the second substrate.

Optionally, the second electrode may be located on the second substrate.

Also disclosed herein is pressure-sensitive sheet for detecting a force applied to an object, the sheet comprising: a first substrate having a first electrical connection region and a first electrode region thereon, the first electrical connection region being electrically connected to the first electrode region; a second electrode region physically separated from the first electrode region; a second electrical connection region electrically connected to the second electrode region; a pressure-sensitive layer arranged between the first electrode region and the second electrode region to provide an electrical connection therebetween, the pressure-sensitive layer being arranged to change electrical resistance in response to pressure changes, wherein the first electrical connection region and the second electrical connection region are arranged to provide circuit terminals of the first electrode and the second electrode respectively.

Optionally, the pressure-sensitive sheet further comprises a second substrate having the second electrode region thereon, the first electrode region and the second electrode region being located between the first substrate and the second substrate, wherein the first substrate has the second electrical connection region, and wherein the second electrode region is electrically connected to the second electrical connection region via a first tab region located on the second substrate.

Optionally, the second electrical connection region comprises a second tab region corresponding to the first tab region of the second substrate, the first tab region being electrically connected to, and overlapping with, the second tab region.

Optionally, the circuit terminals are located at a hub region of the first substrate.

Optionally, the first electrode region comprises a plurality of first electrode regions, each first electrode region having a separate circuit terminal at the hub region.

Optionally, the second electrode region comprises a plurality of second electrode regions, the plurality of second electrode regions sharing a single circuit terminal at the hub region.

Optionally, the plurality of first electrode regions comprises a multi-dimensional array of first electrode regions, and wherein the plurality of second electrode regions comprises a corresponding multi-dimensional array of second electrode regions.

Optionally, the second substrate has the second electrical connection region thereon, and the hub region is located at a central region of the first substrate.

Optionally, the pressure-sensitive sheet is substantially rectangular.

Optionally, the first and second electrical connection regions, and the first and second electrode regions, are printed electrically conductive ink.

Optionally, the pressure-sensitive layer comprises pressure-sensitive ink, such as printed or screen coated ink.

Optionally, the pressure-sensitive layer is a pressure-sensitive paste.

Optionally, at least one of the first substrate or the second substrate is formed of polyurethane.

Optionally, the pressure-sensitive sheet further comprises a protective layer.

Optionally, the protective layer is formed of polyurethane.

Optionally, the pressure-sensitive sheet further comprises at least one of a power source and a processor.

Also disclosed herein in a roll comprising a plurality of the pressure-sensitive sheet.

Also disclosed herein in a system comprising the pressure-sensitive sheet, the system being arranged to receive data indicative of a change in electrical resistance of the pressure-sensitive sheet.

Optionally, the data is received by a processor electrically connected to the pressure-sensitive sheet.

Optionally, the system is further arranged to determine, using a processor, a value of the force applied to the object based on the change in electrical resistance of the pressure-sensitive sheet.

Optionally, the system is further arranged to output the value of the force.

Optionally, the system further comprises a plurality of the pressure-sensitive sheet, each pressure-sensitive sheet having a corresponding location for a surface of the object, the system being further arranged to determine, using a processor, a location of the force applied to the object based on the change in electrical resistance of one or more of the plurality of pressure-sensitive sheets.

Optionally, the data includes date and/or time data.

Also disclosed herein is a modular system comprising: a first and a second of the pressure-sensitive sheet, wherein one of the first or second electrical connection regions of the first pressure-sensitive sheet overlaps and is in electrical contact with one of the first or second electrical connection region of the second pressure-sensitive sheet.

Optionally, the first pressure-sensitive sheet and the second pressure-sensitive sheet lie adjacent to each other.

Also disclosed herein in a method of forming the pressure-sensitive sheet of any preceding claim, the method comprising forming one or more of the following directly on the object: the first electrode region and the first electrical connection region; the second electrode region; the second electrical connection region; the pressure-sensitive layer; or an insulating layer.

Optionally, first electrode region, the first electrical connection region, and the second electrical connection region are formed directly on the object.

Optionally, the second electrode region is additionally formed directly on the object, the first electrode region and the second electrode region being formed laterally spaced apart on the object.

Optionally, the pressure-sensitive layer is formed to overlap both the first electrode region and the second electrode region.

Optionally, only the insulating layer is formed directly on the object.

Optionally, the pressure-sensitive layer is formed directly on the object, and the first electrode region and the second electrode region are formed on the pressure-sensitive layer, the first electrode region and the second electrode region being formed laterally spaced apart on the pressure-sensitive layer.

BRIEF DESCRIPTION OF THE DRAWINGS

Embodiments of the invention will now be described, by way of example, with reference to the drawings, of which:

FIG. 11 shows a first pressure-sensitive sheet half 1100 and a second pressure-sensitive sheet half 1200 according to a fourth embodiment;

FIG. 12 shows a pressure-sensitive sheet 1250 formed of the first pressure-sensitive sheet half 1100 and the second pressure-sensitive sheet half 1200 of the fourth embodiment;

FIG. 13 shows a first pressure-sensitive sheet half 1300 according to a fifth embodiment;

FIG. 20 shows a variant of the pressure-sensitive sheet 1800.

FIG. 21 shows another variant of the pressure-sensitive sheet 1800.

FIG. 22 shows another variant of the pressure-sensitive sheet 1800.

Throughout the description and drawings, like reference numerals refer to like parts.

DETAILED DESCRIPTION

Various embodiments and examples of the invention will now be described, with reference to the accompanying figures.

Figure 1:
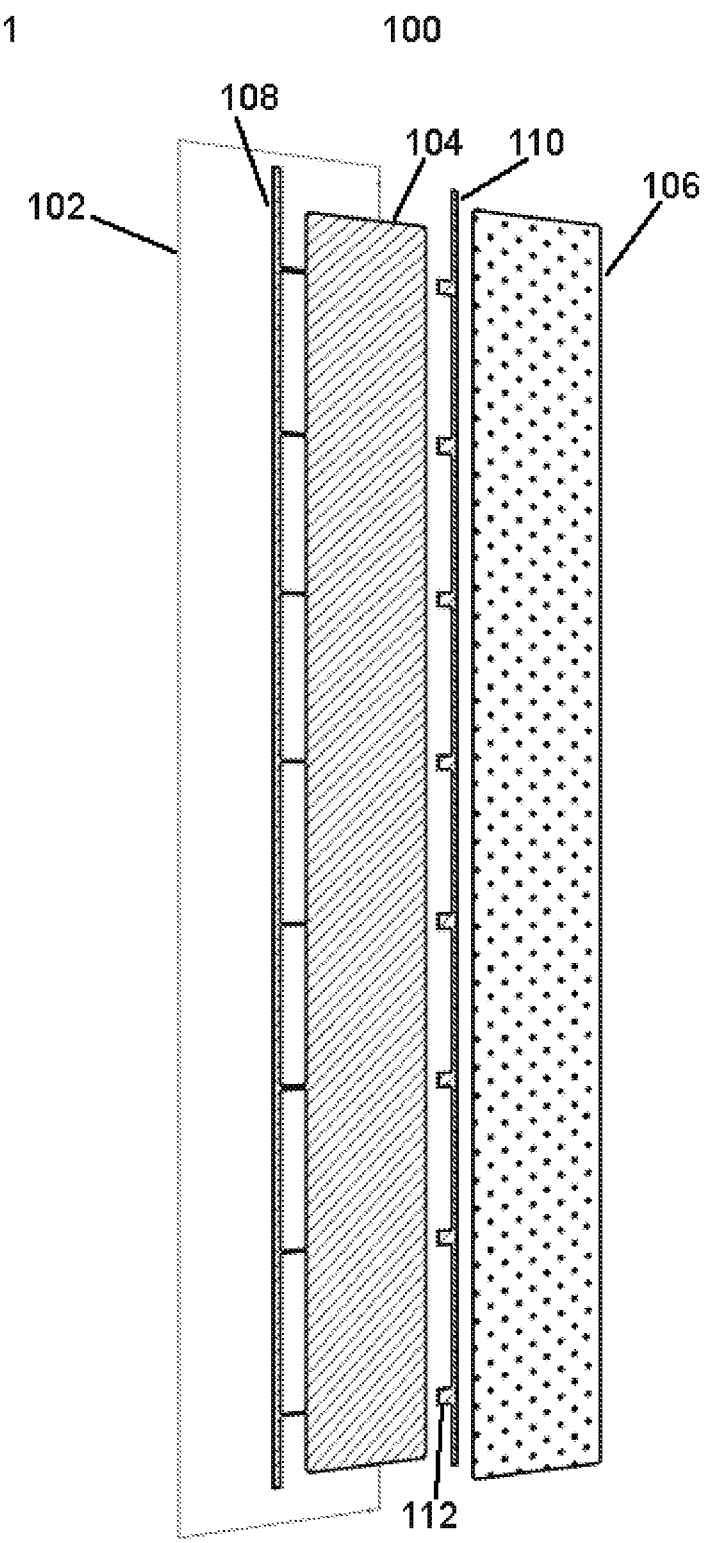
FIG. 1 shows a first pressure-sensitive sheet half 100 according to a first embodiment.
Figure 2:
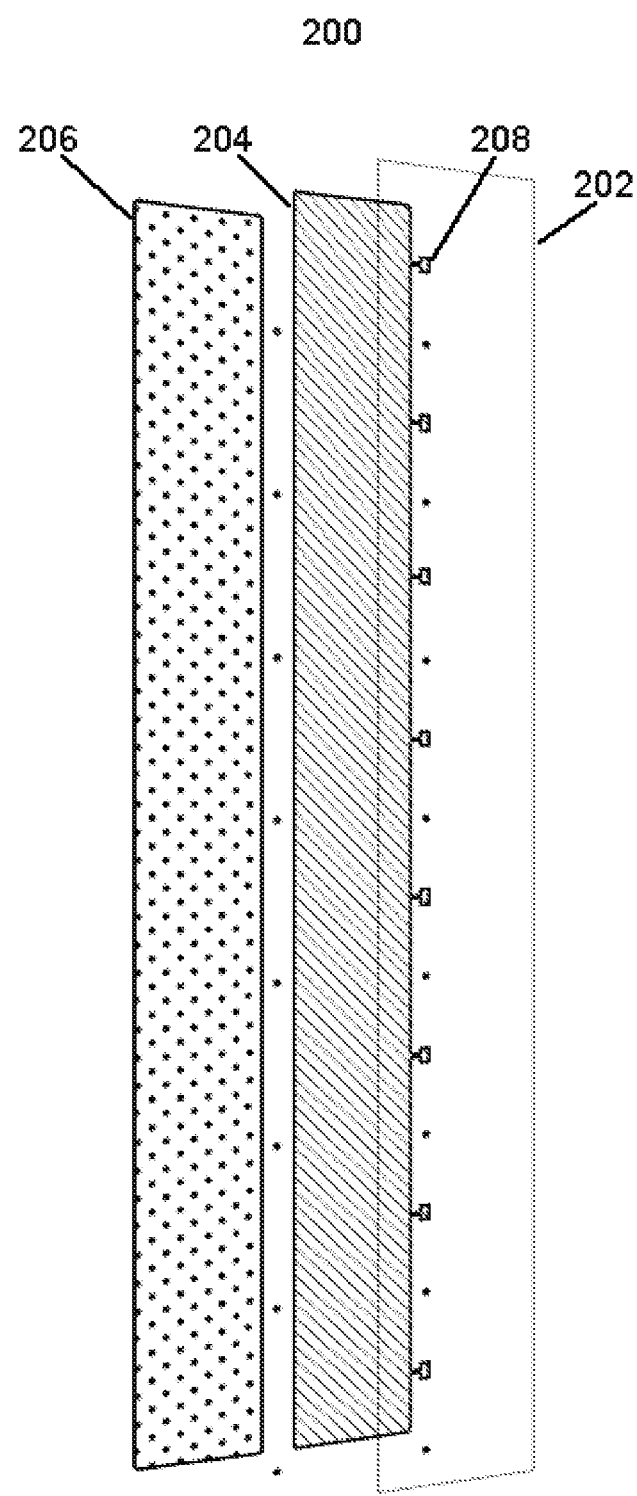
FIG. 2 shows a second pressure-sensitive sheet half 200 according to the first embodiment.
Figure 3:
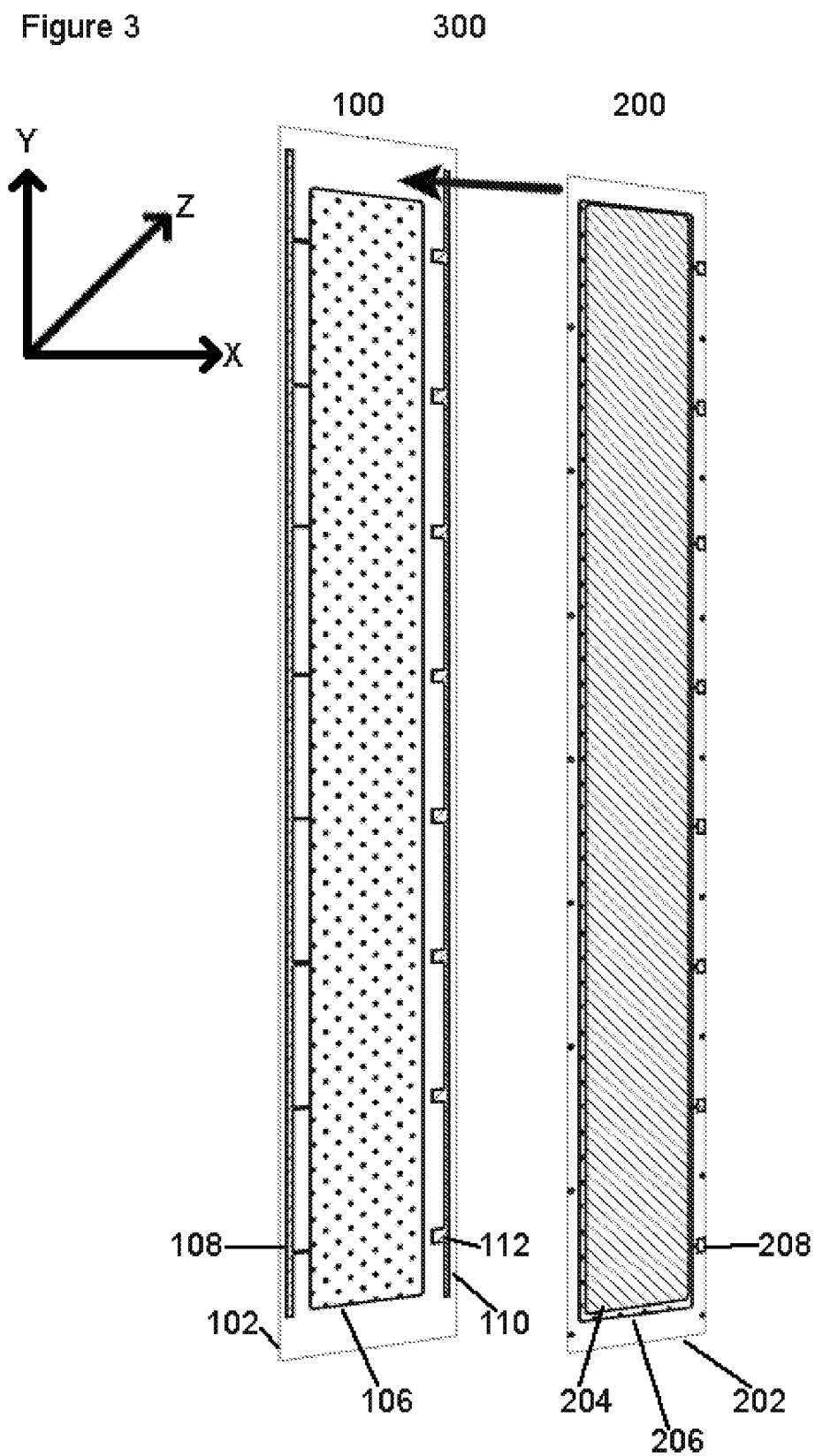
FIG. 3 shows a pressure-sensitive sheet 300 formed of the first pressure-sensitive sheet half 100 and the second pressure-sensitive sheet half 200 of the first embodiment.

FIGS. 1 to 3 show a first embodiment of a pressure-sensitive sheet formed of two sheet halves. Although the term "pressure-sensitive" is used to describe the sheet, the term "force-sensitive" may also be used. This applies to all described embodiments equally.

FIG. 1 shows a first pressure-sensitive sheet half 100. The first half 100 is formed of a variety of layers on a substrate 102. On the substrate 102 is a layer providing a first electrode region 104, a first connection region 108 and a second connection region 110. The first connection region 108 is electrically connected to the first electrode region 104, for example by one or more conductive track lines on the same layer as the first electrode region 104 and the first connection region 108, the one or more conductive track lines extending between the first connection region 108 and the first electrode region 104. FIG. 1 shows a plurality of conductive track lines spaces along the length of the first half 100. Such conductive tracks lines may be spaced apart evenly along the length, or irregularly. As such, the conductive track lines provide multiple electrical connections between the first electrode 104 and the first connection region 108 along the length of the first half 100. The second connection region 110 comprises one or more first tab regions 112 adjacent the second connection region 110 and electrically connected thereto. Such an electrical connection may again be provided by one or more track lines forming part of the same layer as the second connection region 110 and the one or more first tab regions 112, the one or more track lines extending between the second connection region 110 and the one or more first tab regions 112. Alternatively, the electrical connection between the second connection region 110 and the one or more first tab regions 112 may be via a direct abutment of the second connection region 110 and the one or more first tab regions 112, as shown in FIG. 1.

On the first electrode region 104 is a layer providing a pressure-sensitive ink layer 106 covering substantially all of the first electrode region 104. The surface area of the pressure-sensitive ink layer 106 may therefore be at least equal to that of the first electrode region 104 such that at least the entirety of the first electrode region 104 is covered by the pressure-sensitive ink layer 106. For reasons that will become clear later, when the surface area of the pressure-sensitive ink layer 106 exceeds that of the first electrode region 104, the risk of an unintended direct electrical connection (shorting) between the first electrode region 104 and other elements is avoided. Optionally, one or more dielectric layers may be present to minimise the risks of shorting. Such a dielectric layer may be made of any appropriate material, such as the dielectric ink DuPont 5018. The dielectric layer may, for example, be provided between the first electrode region 104 and the second electrode region 110, however other locations are possible. The dielectric layer may therefore form part of one or both of the pressure-sensitive sheet halves.

FIG. 2 shows a second pressure-sensitive sheet half 200. The second half 200, similar to the first half 100, is also formed of a variety of layers on a substrate 202. On the substrate 202 is a layer providing a second electrode region 204 and one or more second tab regions 208 adjacent the second electrode region 204 and electrically connected thereto. Such an electrical connection may again be provided by one or more track lines forming part of the same layer as the second electrode region 204 and the one or more second tab regions 208, between the second electrode region 204 and the one or more second tab regions 208 as shown in FIG. 2. Alternatively, the electrical connection between the second electrode region 204 and the one or more second tab regions 208 may be via a direct abutment of the second electrode region 204 and the one or more second tab regions 208. On the second electrode region 204 is a layer providing a pressure-sensitive ink layer 206 covering substantially all of the second electrode region 204.

FIG. 3 shows the first pressure-sensitive sheet half 100 and the second pressure-sensitive sheet half 200. The arrow indicates the direction in which the second half 200 is adhered/attached and/or hermetically sealed to the first half 100 and, once adhered together, the two halves form a pressure-sensitive sheet 300. Due to the presence of the pressure-sensitive ink layers 106 and 206, the first and second electrode regions 104 and 204 are not in physical contact in the pressure-sensitive sheet 300, as the ink layers provide a physical barrier between the two electrode regions.

In the pressure-sensitive sheet 300, the second electrode region 204 of the second half 200 is electrically connected to the second connection region 110 of the first half 100 by virtue of the one or more second tab regions 208. Such an electrical connection may be via direct physical contact between the one or more second tab regions 208 and the second connection region 110, by virtue of these elements being at least partially on top of each other in the assembled pressure-sensitive sheet 300. The direct physical contact may, for example, be between the one or more second tab regions 208 and the one or more first tab regions 112 of the second connection region 110, as would be the case in FIG. 3. Alternatively, one or more other elements may be between the one or more second tab regions 208 and the second connection region 110, such as an electrically conductive adhesive tape. Such a tape allows an electrical connection therethrough when in contact with both the one or more second tab regions 208 and the second connection region 110. Such a tape may therefore be applied on top of the second connection region 110, specifically the one or more tab regions 112, before assembly of the pressure-sensitive sheet 300. Alternatively, such a tape may be applied on top of the one or more second tab regions 208. Indeed, the tape may be applied in both locations. Regardless of which location is chosen, the electrically conductive adhesive tape is disposed between opposing elements of the two halves 100 and 200 to provide an electrical connection therebetween, and also to provide an adhesive connection therebetween. The tape may therefore serve as a manner of securing the first half 100 to the second half 200. The electrically conductive adhesive tape is preferred to only provide an electrical connection in the z-axis, and may for example be tape such as 3M 9703 by 3M (www.3 m.co.uk). Other suitable anistropic conductive films (ACF) are also available.

As well as conductive tape, an adhesive may be used to bond the two halves together. The adhesive thickness preferably equal to, or less than, the combined dry piezo-resistive ink layer thickness if the surface area of the object (to which the piezo-resistive sheet is applied) is greater than or equal to the surface area of first or second electrode region.

The first electrode region 104 and the second electrode region 204 serve as electrodes applied to opposite sides of the pressure-sensitive ink layers 106 and 206. Any known pressure-sensitive ink may be used as the pressure-sensitive ink layers 106 and 206. These layers may also be termed piezoresistive layers since, as the skilled person would understand, each pressure-sensitive ink layer has piezoresistive properties. An increase in the pressure applied to the pressure-sensitive ink layer gives rise to a decrease in resistance of the pressure-sensitive ink layer. The ink can be any electrically conductive printable ink, including screen coated or other material, with the key function of registering an analogue change in resistance when subject to mechanical strain. Any piezoresistive/piezoelectric material may be used as the pressure-sensitive ink. The pressure-sensitive ink material may be, for example, any type of carbon nanotubes (CNT), quantum tunnelling conductance, and may comprise carbon, carbon black, functionalised carbon, graphite, graphene, functionalised graphene, magnetite particles and/or any suitable piezo-electric materials as examples.

For example, the pressure-sensitive ink may be formed of functionalised graphene nanoparticles (GNP), such as the ink produced by Haydale and described in WO2016/102689A1 (particularly page 5 lines 26-36, and page 9 line 24 to page 10 line 9). Such an ink is formed of carbon nanoparticles dispersed in a polymer matrix material. The carbon particles have a high aspect ratio, as this increases the resistance sensitivity of the ink. The ink layer may have a high resistance in the absence of an applied force, such that current flow in the absence of applied force is negligible. In the embodiment of FIGS. 1 to 3, there may also be effectively no lateral conductivity (i.e. no X or Y axis conductivity, only Z-axis conductivity in FIG. 3) in the graphene ink particles as this is not required to provide an electrical connection between the first electrode region 104 and the second electrode region 204. However, the ink becomes conductive or more conductive when the structure of the particles is compressed. Another example pressure sensitive ink is that made by Peratech (https://www.peratech.com/), which can also provide lateral conductivity (X-axis and/or Y-axis conductivity in FIG. 3), or, Quantum Technology Super Sensors (QTSS) ink.

The combination of the first and second electrode regions and the one or more pressure-sensitive ink layers provides one or more piezoresistive sensors. As the skilled person would understand, a piezoresistive sensor changes resistance when subject to mechanical strain, and therefore there exists a measureable force and/or pressure—resistance relationship. The skilled person would also understand how such a change in resistance could be detected, which may include using a potential divider for example. A calibration step may also be used to determine the relationship between resistance change and mechanical strain. This may be by applying a known force to the sensor and measuring the resistance, and using this data for calibration. Due to the properties of the piezo-resistive ink previously described, any of the piezoresistive sheets described herein may also be used as strain gauges.

Although two different pressure-sensitive ink layers 106 and 206 have been described, there may only be one pressure-sensitive ink layer in the pressure-sensitive sheet 300. In other words, one of the halves 100 or 200 may not have any pressure-sensitive ink layer(s). In addition, multiple pressure-sensitive ink layers may be applied to only one of the halves 100 or 200. Alternatively, multiple printings of one or both pressure-sensitive ink layers could be applied. For example, the pressure-sensitive ink layer 106 or 206 may be formed of two or more layers of ink, each layer being directly applied on top of the previous ink layer. As such, the layers 106 or 206 may each be formed of multiple layers of ink. By using multiple layers, the layers 106 or 206 are thicker and therefore the piezo resistive range is increased. As such, higher forces can be measured using the pressure-sensitive sheet 300.

Although the described sheet in this and other embodiments has been described as "pressure-sensitive", the skilled person would understand that such a sheet may also be termed "force-sensitive" in that the sheet changes electrical resistance when experiencing an applied force.

The first and second substrate layers 102, 202 may each have a thickness of between 25 µm to 350 µm, for example. Any flexible material film can be used as the substrate layers, and a thin film flexible plastic and/or polymer with a thickness of around 100 µm-125 µm, which can be printed on at least one side, may be preferred. In one example, the thickness of each substrate layer is 100 µm. In another example, the thickness of each substrate layer is 50 µm. One or both substrate layers may be made of PET, and one or both substrate layers may be transparent and optionally heat stabilised. Alternatively, one or both substrate layers may be formed of polyurethane. As another option, one or more of the substrate layers could be formed of a metalised barrier film with pre-constructed tracks/electrodes, or, metalised film that can be printed onto and then have tracks/electrodes constructed typically patterned by laser. As another option, one or more of the substrate layers could instead be formed of a rigid material instead of a flexible material, such as a rigid metal, rigid plastic or any other rigid material.

The electrode regions, connection regions, tracks and tab regions can be applied to their respective substrate layer using low-temperature solders (bismuth and/or tin as examples), conductive adhesive or anisotropic conductive tape and the like.

The material of these regions can be any conductive material such as a metal, preferably silver, or indeed copper, aluminium or conductive carbons. Any metal or conductive material may be used. In an example, the material is printed using inkjet, screen, rotary, flexographic, gravure and other similar printing processes. In the case of the substrate being a metalised barrier film with pre-constructed tracks/electrodes, one or more of the electrode regions, connection regions and tab regions may be pre-constructed without the need for any separate printing step.

Alternatively, either substrate itself may be provided with an electrically conductive layer of conductive ink covering substantially all of the substrate. Then, a lasering or other process may be used to remove part of the electrically conductive layer and form the necessary electrode regions, connection regions, tracks and tab regions.

Optionally, a carbon ink layer may be located between the conductive ink forming the first or second electrode region and the respective pressure-sensitive ink layer. Such a carbon ink layer may be printed on top of the first or second electrode region before the respective pressure-sensitive ink layer is applied. In the case of the conductive ink being silver, the use of the carbon ink layer negates any silver surface issues such as protrusions or irregularities, and may also serve to increase the resistance enabling higher force levels to be measured.

The first electrical connection region 108 provides a region having at least one first circuit terminal of the pressure-sensitive sheet 300 and the second electrical connection region 110 provides a region having at least one second circuit terminal of the pressure-sensitive sheet 300. These terminals may be used to connect the pressure-sensitive sheet 300 as a circuit element in a circuit. For example, the pressure-sensitive sheet 300 may be electrically connected to a power source and a processor in series by way of these circuit terminals. When a force is applied to the sheet 300, the processor detects a change in resistance of the pressure-sensitive ink layer(s) between the electrode regions and, based on the detected change, derives a force value based on a predetermined relationship between resistance change and force. The processor is therefore configured to determine a magnitude of a force or pressure applied to the pressure-sensitive sheet 300, based on data received via the first and second circuit terminals. Such determined force or pressure values may be stored in a memory. The power source is configured to provide electrical power to the force-sensitive sheet 300 and the processor.

As discussed, first and second circuit terminals are arranged to be connected to other elements of an electrical circuit, such as the processor and the power supply. There may be other circuit elements as well, such as an A/D converter between the circuit terminal and the processor. These other circuit elements may be integral with the pressure-sensitive sheet and located on a printed circuit board (PCB), or the PCB may be remote from the pressure-sensitive sheet. The first and second circuit terminals are therefore arranged to be connected to a printed circuit board (PCB), either via electrically conductive tracks or via separate cabling. Such cabling may for example be a flat flex cable bonded to the circuit terminals, or crimp connectors between the circuit terminals and the cabling.

The electrical connection to the first and second electrical connection regions 108, 110 may be at one end of the sheet 300, at opposite ends of the sheet 300, or at sides of the sheet 300. FIGS. 1 to 3 show the first and second electrical connection regions 108, 110 as being located at the sides of the sheet 300. As shown in FIGS. 1 to 3, the first electrical connection region 108 runs along one edge region of the first substrate 102 and the second electrical connection region 110 runs along an opposite edge region of the first substrate 110. These electrical connection regions 108, 110 provide continuous lines of connection to the respective first and second electrode regions 104, 204 such that the sheet 300 may be connected to other circuit elements at any point along the length of the sheet 300. In order to ensure that the first and second electrical connection regions 108, 110 are exposed to allow such connections, the second substrate 202 is a different shape to the first substrate 102. As shown in FIGS. 1 to 3, the second substrate 202 may be narrower in the X direction than the first substrate 102 such that the second substrate 202 is located between the first and second electrical connection regions 108, 110 in the sheet 300. In this manner, the first and second electrical connection regions 108, 110 are not covered by the second substrate 202. Of course, the second substrate 202 may be any other shape that ensures at least some part of the first and second electrical connection regions 108, 110 is not covered by the second substrate 202.

As shown in FIGS. 1-3, the pressure-sensitive sheet 300, and its respective halves 100 and 200, may be a conventional tape shape. Such a tape shape may be termed an elongate strip, and may be relatively long in the Y direction and relatively short in the X direction. The tape or strip may form part of a roll of tape, in the conventional sense.

Although the sheet 300 is shown as a tape shape in FIGS. 1-3, the sheet 300 may be any other shape having first and second electrical connection regions 108, 110 running along different edges of the shape. In this manner, the sheet 300 provides multiple connection points to the first and second electrical connection regions 108, 110 along edges of the sheet 300.

Beneficially, by providing the first and second electrical connection regions 108, 110 along opposite edges of the pressure-sensitive sheet 300, electrical connection to the sheet 300 may be achieved at multiple points along the edges of the sheet 300. For example, one electrical connection could be made at a point nearer the bottom of the sheet 300 on one edge, and another electrical connection could be made at a point in the middle or near the top of the sheet 300 but on the other edge. In the case of the sheet 300 of FIG. 3, for example, electrical connection along any point along the edges of the sheet 300 provides the necessary connection to the first and second electrode regions 104, 204.

Another benefit of the sheet 300 is that both the first electrical connection region 108 and the second electrical connection region 110 are formed on the same substrate 102. This is possible by virtue of the electrical connection between the second electrical connection region 110 and the second electrode region 204, which is achieved via an electrical connection of the one or more second tabs 208 and the one or more first tabs 112, or an electrical connection of the one or more second tabs 208 with the second electrical connection region 110. This electrical connection ensures that the electrical terminals of the sheet 300 are located on the same substrate, which facilitates connection of the sheet 300 to a circuit as the circuit connections may be made in a simple manner with the circuit terminals of the substrate 102 (provided by the first and second electrical connection regions 108, 110).

Although tabs 112 and 208 are described in this embodiment, such tabs are optional as the necessary electrical connections could be achieved via appropriate overlapping of the second electrical connection region 110 and the second electrode region 204 in the assembled sheet 300.

Applying Tape to Object

In order for the pressure-sensitive sheet 300 to detect a force applied to an object, the pressure-sensitive sheet 300 must be placed between the object and the force to be applied. To achieve this, an adhesive may be applied between the sheet 300 and the object to adhere the sheet 300 to the object.

Such an adhesive may be part of the pressure-sensitive sheet 300. In an example, the pressure-sensitive sheet 300 is applied to an object with the second half 200 placed down and onto the object. In this example, the adhesive may be directly applied to the second half 200, on the face of the second substrate 202 opposite the face having the electrode region 204, or may be applied to, or part of, an optional bottom protective layer applied to that face of the second substrate 202. The bottom protective layer may be formed of a more robust material than that of the second substrate 202 in order to protect the second substrate 202 from damage. Like the second substrate 202, the bottom protective layer may not cover some or all of the first and second electrical connection regions 108, 110. The same applies to the adhesive, which also may not cover some or all of the first and second electrical connection regions 108, 110. In this manner, the first and second electrical connection regions 108, 110 may not be covered, or be at least partly uncovered, by the bottom protective layer and the adhesive. In the example shown in FIG. 3, the bottom protective layer may therefore be a narrower strip than that of the second substrate 202 and may be located between the first and second electrical connection regions 108, 110 to cover the electrode regions 104, 204. On top of the adhesive may be a conventional peelable sheet or paper such that the adhesive is not exposed until needed, and such that the pressure-sensitive sheet 300 may be rolled up to form a roll of the sheet 300 without adhering to itself.

To protect a top surface of the sheet 300, which is the face of the first substrate 102 opposite the face having the first electrode region 104, a top protective layer may also be applied to the first half 100. In this manner, both sides of the sheet 300 are protected from damage from external sources by respective protective layers. The top protective layer may therefore be the same shape as the first substrate 102.

The functions of the top protective layer and the first substrate 102 may be combined into a single combined protective layer performing both functions. Such a combined protective layer serves the role of the first substrate, by virtue of having the elements 104, 108 and 110 printed thereon, and the role of the top protective layer by virtue of having a thickness sufficient to provide the necessary protection from an incoming force. The thickness of the combined protective layer may therefore be greater than 250 μm. The combined protective layer may, for example, be formed of polyurethane and optionally an aviation compliant material, such as 3M 8671HS High Sheer Polyurethane Protection by 3M.

The adhesive used to attach the pressure-sensitive sheet 300 to an object may be chosen depending on the object. For example, in the case of the pressure-sensitive sheet 300 being attached to an airplane or drone wing, the adhesive may be aviation compliant such as the adhesive provided by 3M 8671 HS protection tape by 3M.

An adhesive may be provided between substrates to increase the bonding between substrates. Such an adhesive may be provided in addition to the previously discussed electrically conductive adhesive layer. Example adhesives may be any suitable pressure-sensitive adhesive (PSA), for example 3M 9626 Adhesive Transfer Tape by 3M. Alternatively, printable adhesive inks, such as Kiwoprint UV 92 by Kiwo ink (https://www.kiwo.com/adhesives), may be used to provide permanent or semi-permanent bonds. Any electrically conductive adhesive ink could instead or additionally be used.

Modular System

Figure 4:
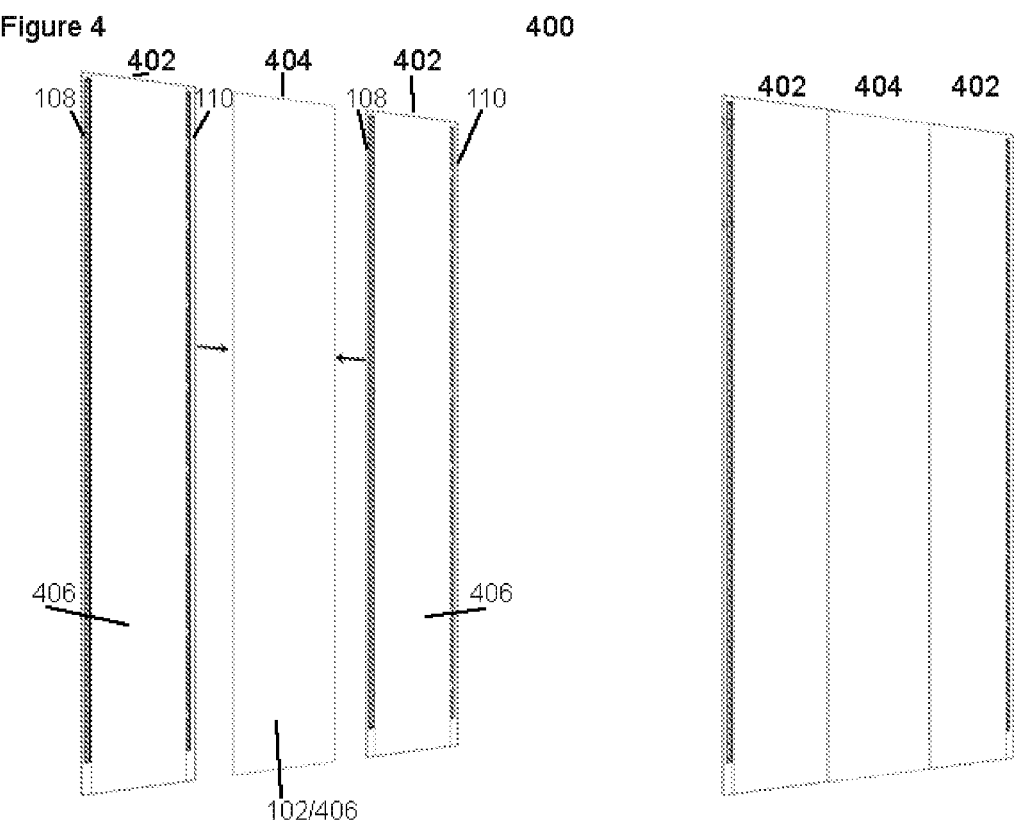
FIG. 4 shows a modular system including male and female variants of the pressure-sensitive sheet 300.

The pressure-sensitive sheet 300 may be part of a modular system 400, shown in FIG. 4, comprising multiple of the pressure-sensitive sheet 300. Such a system includes the sheet 300 having two different variants. The first variant may be termed a "female" sheet 402, and the second variant may be termed a "male" sheet 404.

The male sheet 404 variant of the pressure-sensitive sheet 300 includes all the elements of FIG. 3, including the adhesive applied to the second half 200 (directly or via the bottom protective layer). In other words, in the male sheet 404, the second half 200 is placed down and onto the object. The second half 200 of the male sheet 404 is therefore a "bottom half" in that it is the half that is applied to, and in contact with, an object. The male sheet 404 may optionally also include the top protective layer applied to the first half 100, previously described and shown as element 406 in FIG. 4. The top protective layer 406 of the male sheet 404 therefore covers substantially all of the exposed surface of the male sheet 404. The male sheet 404 may optionally also include the bottom protective layer applied to the second half 200, as previously described.

The female sheet 402 is similar to the male sheet 404, except that the orientation of the top and bottom halves is reversed and the adhesive is in a different location. In other words, the female sheet 402 is a "flipped over" version of the male sheet 404, with the first half 100 placed down and onto the object. The female sheet 402 includes an adhesive applied to the first half 100, on the face of the first substrate 102 opposite the electrode region 104. The adhesive may be directly applied, or by way of an optional protective layer having an adhesive. The first half 100 of the female sheet 402 is therefore the "bottom half" in that it is the half that is applied to, and in contact with, an object.

As for the male sheet 404, in the female sheet 402 at least some of the first and second electrical regions 108, 110 are left exposed in that they are at least partly not covered by the second half 200. In the case of the female sheet 402, this may be achieved by the second substrate 202, and any optional protective layer 406 thereon, being shaped as a strip narrower than the first substrate 102 and being located between the first and second electrical connection regions 108, 110. The second substrate 202 of the female sheet 402, and the optional protective layer 406, faces up.

The electrical connection regions 108, 110 of the female sheet 402 may be arranged in the same way as those of the male sheet 404, or may be arranged differently.

For example, the electrical connection regions 108, 110 of the female sheet 402 may be a "flipped over" version of the male sheet 404 such that, in the modular system 400, the positions of the electrical connection regions 108, 110 are switched as compared to those of the male sheet 404. Specifically, the electrical connection region 108 may be located on the left side of the male sheet 402, but on the right side of the female sheet 404 (from the perspective of FIG. 4). Similarly, the electrical connection region 110 may be located on the right side of the male sheet 402, but on the left side of the female sheet 404.

Alternatively, the electrical connection regions 108, 110 may not be a "flipped over" version of the male sheet 404 such that, in the modular system 400, the positions of the electrical connection regions 108, 110 are the same as those of the male sheet 404. Specifically, the electrical connection region 108 may be located on the left side of the male sheet 404, and also on the left side of the female sheet 402 (from the perspective of FIG. 4). Similarly, the electrical connection region 110 may be located on the right side of the male sheet 404, and also on the right side of the female sheet 402.

To build up the modular system 400, the male sheet 404 and the female sheet 402 are placed side-by-side such that the second electrical connection region 110 of the female sheet 402 is in electrical contact with either the first electrical connection region 108 or the second electrical connection region 110 of the male sheet 404. In the embodiment of FIGS. 1 to 3, it doesn't matter whether the second electrical connection region 110 of the female sheet 402 is in contact with the first electrical connection region 108 or the second electrical connection region 404 of the male sheet 404.

In this manner, multiple male and female sheets may be arranged side-by-side to provide a modular system of pressure-sensitive sheets 300. Connection of the modular system to other circuit elements, such as a processor and a power source, may be at only two points in the modular system or may be at more than two points. For example, the left-most female sheet 402 in FIG. 4 may provide one circuit terminal by virtue of its first electrical connection region 108, and the right-most female sheet 402 in FIG. 4 may provide the other circuit terminal by virtue of its second electrical connection region 110. Alternatively, one or all of the other first and second electrical connection regions 108 and 110 may each provide their own circuit terminal to allow force/pressure detection on a per-sheet basis. The described modular system of pressure-sensitive sheets 300 may be used to build up a pressure-detecting surface including a plurality of the pressure-sensitive sheets 300, which may be adapted to any size in a simple manner.

The pressure-sensitive sheets 300, as part of the modular system 400 or in isolation, have a very large variety of uses. One or more of such sheets 300 may be applied to objects easily and in a variety of shapes and patterns. Example uses of the pressure-sensitive sheets 300, and any of the other pressure-sensitive sheets described herein, are the following:

Schools, universities, sports, buildings, aviation, planes, drones, wind turbine blades, helicopter blades, production, manufacture, automotive, marine, submarine, robotics, engineering. Applications on any surface including flat and/or curved that may be conductive or non-conductive. Monitoring changes pressure in wind and water, for example, sailing and commercial vessels to optimise course. Detection system in bridges for Bridge bolt failure and tension monitoring. In between bolt head and washer, or, bolt end to bridge. Monitoring movement and location of animals and humans in the form of moveable mats or permanent installations in floors, for example.

Other examples uses are in tiles, rugs, or carpets for a cable connect to the mains, fire & police monitoring to track people in a building, rental space monitoring, valuable goods monitoring to prevent theft, health monitoring to detect people falling and remaining motionless, footfall monitoring into retail outlets, security systems and mats, NHS and hospital use to detect falls, use in smart bandages to sense dressings on wounds are suitable, manufacturing applications including QA to determine if a product has been impacted during assembly, transit, product analysis and labelling, anti-tamper detection, hobbyist markets, sports equipment, strain gauges and fluid level sensing.

As described above and as shown in FIGS. 1 and 2, the pressure-sensitive sheet 300 comprises a single, continuous first electrode 104 and a single, continuous second electrode 204. These electrodes each extend along the length of their respective halves. As there is a plurality of conductive track lines along the length of the first electrode 104, the pressure-sensitive sheet 300 only requires two cable connections (one for the first electrical connection region 108, and one for the second electrical connection region 110) in order to perform its function.

Additionally, the pressure-sensitive sheet 300 may conveniently be cut, torn or otherwise adapted to any desired length as the plurality of conductive track lines between electrode regions and connection regions ensures that an electrical connection is always maintained between the first electrical connection region 108 and the first electrode 104. The pressure-sensitive sheet 300 may therefore include one or more perforations extending across the width of the sheet (X direction), facilitating a cutting or tearing of the strip along the perforations. The perforations may extend in a straight line across the width, or any other shaped line. The perforations may be laser score lines. Alternatively, one or more markings may be providing along the length of the sheet (Y direction) to indicate that such regions are suitable to be cut without necessarily providing perforations. Such markings may be equally spaced apart along the length to facilitate the cutting of equally-sized sensors from the pressure-sensitive sheet 300. An example of such markings can be seen as the dots placed along the length of the second half 200 of FIG. 2, and such dots may be visible on the exterior of the pressure-sensitive sheet 300. It can therefore be seen that the pressure-sensitive sheet 300, or a modular system including the sheet 300, may be appropriately sized for the specific task by cutting or tearing the sheet to the desired length.

Figure 5:
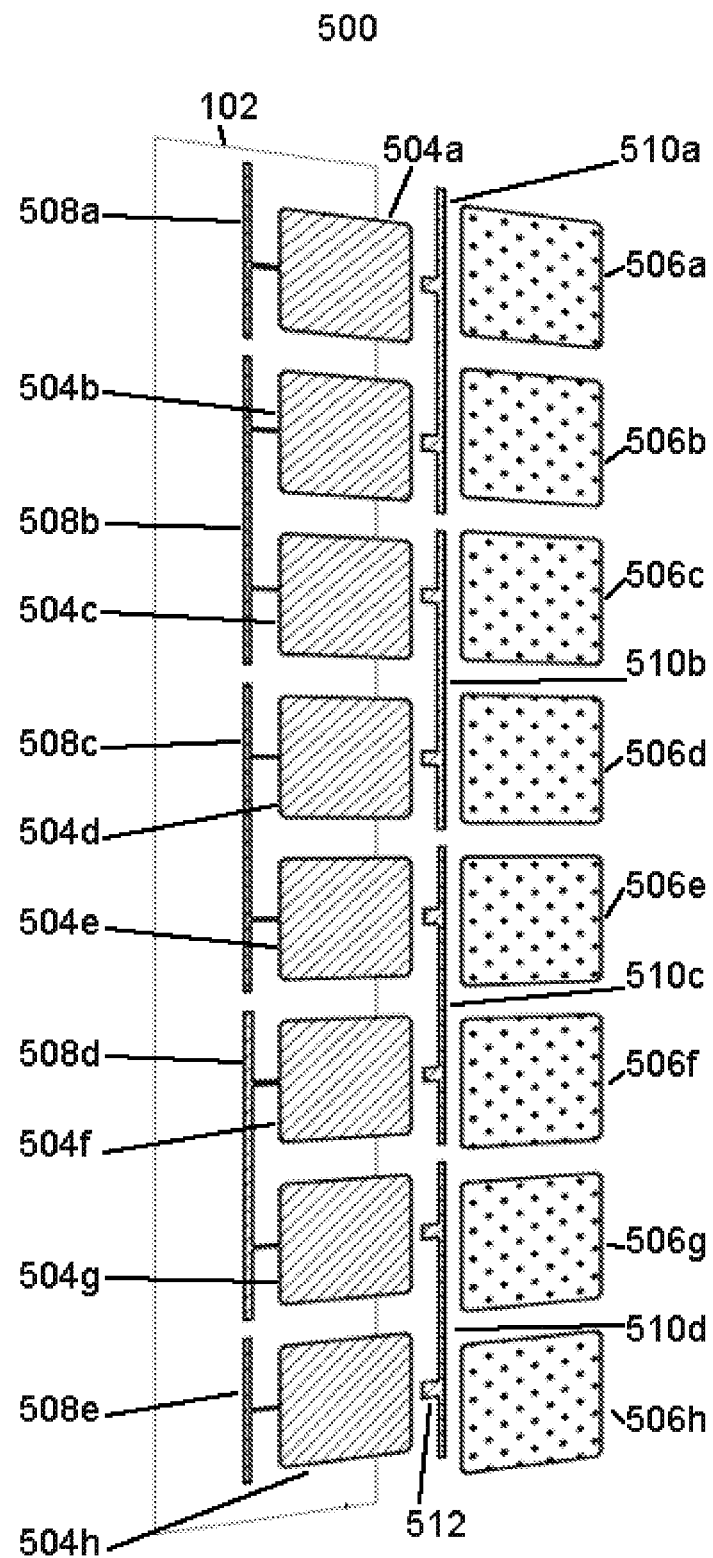
FIG. 5 shows a first pressure-sensitive sheet half 500 according to a second embodiment.
Figure 6:
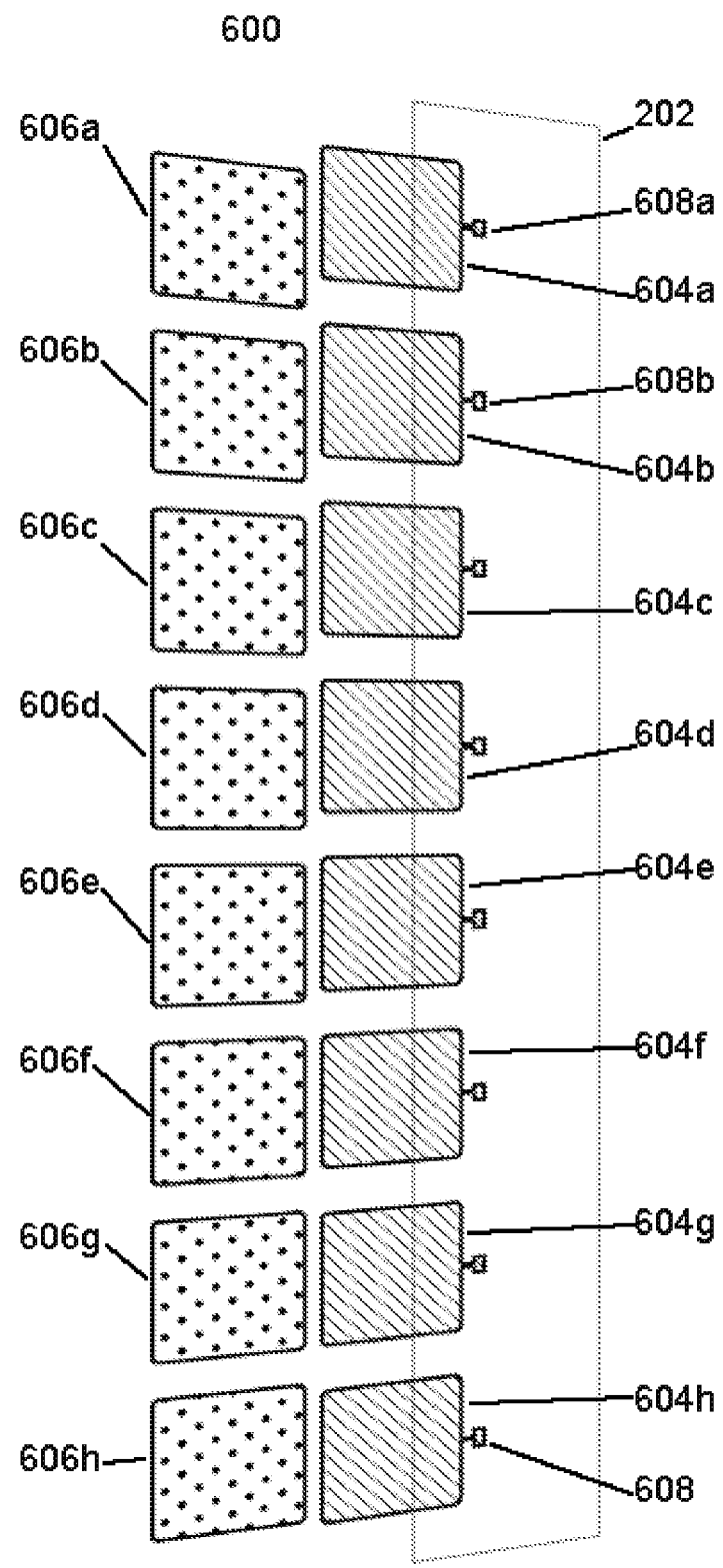
FIG. 6 shows a second pressure-sensitive sheet half 600 according to the second embodiment.
Figure 7:
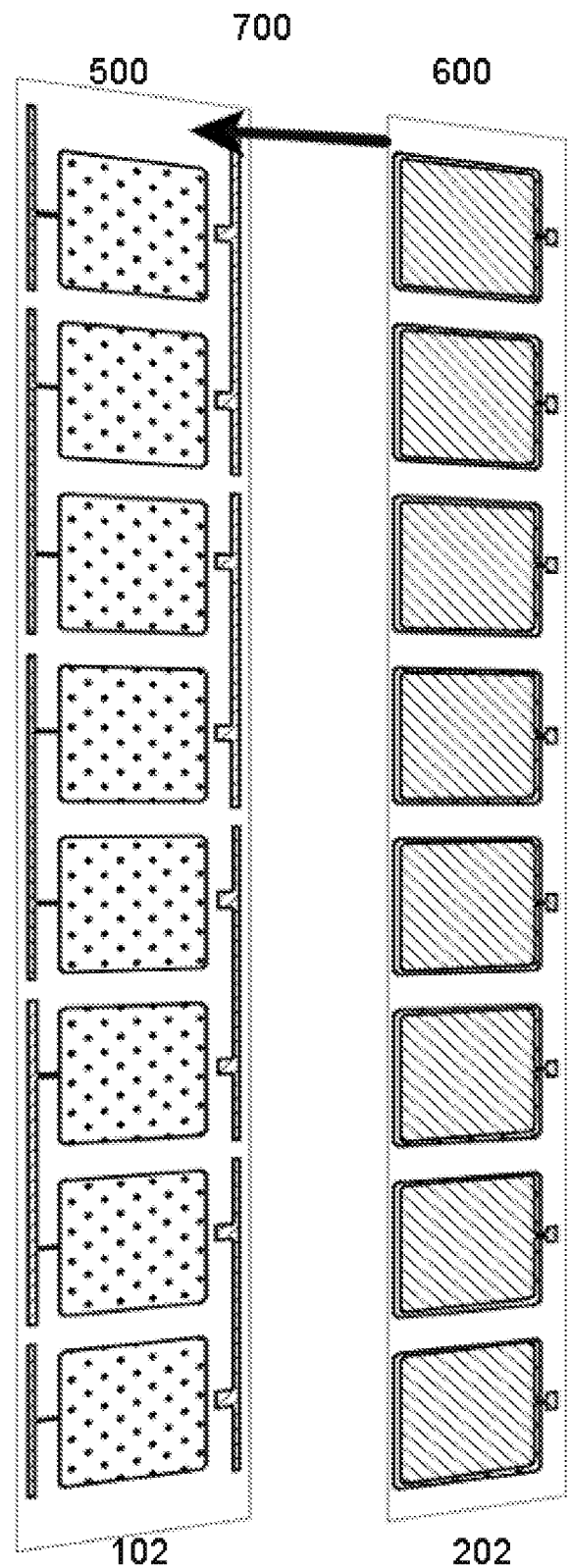
FIG. 7 shows a pressure-sensitive sheet 700 formed of the first pressure-sensitive sheet half 500 and the second pressure-sensitive sheet half 600 of the second embodiment.

FIGS. 5 to 7 show a second embodiment of a pressure-sensitive sheet formed of two sheet halves.

A pressure-sensitive sheet 700 of the second embodiment is made up of a first half 500, shown in FIG. 5, and a second half 600, shown in FIG. 6.

The first half 500 is similar to the first half 100 and layered in the same way. Instead of the first electrode region 104, the first half 500 has a plurality of first electrode regions 504a-504h. In addition, instead of the first electrical connection region 108 there is a plurality of first electrical connection regions 508a-508e, and instead of the second electrical connection region 110 there is a plurality of second electrical connection regions 510a-510d. As for the first half 100, each of the first electrode regions 504a-504h is covered by a respective pressure-sensitive ink layer 506a-506h.

The first electrode regions 504a-504h are separated from each other along the length of the substrate 102 by the substrate 102 disposed between each of the first electrode regions 504a-504h. Each electrode region 504a-504h may be substantially rectangular, however any shape may be used.

Each of the first electrode regions 504a-504h is associated with a unique combination of the plurality of first electrical connection regions 508a-508e and the second electrical connection regions 510a-510d. In summary, the first electrical connection region 108 comprises a plurality of first subregions 508a-e, the second electrical connection region 110 comprises a plurality of second subregions 510a-d, and the first electrode region 104 comprises a plurality of first electrode regions 504a-h, wherein at least one of the first subregions 508a-e is associated with a first group of the first electrode regions 504a-h, and wherein at least one of the second subregions 510a-d is associated with a second group of the first electrode regions 504a-h, at least some of the first electrodes regions 504a-h of the first group being different from the first electrode regions 504a-h of the second group. At least one of the first electrode regions 504a-h of the first group may be the same as at least one of the first electrode regions 504a-h of the second group.

For example, the first electrode region 504a in FIG. 5 is associated with the first electrical connection region 508a and the second electrical connection region 510a. These electrical connection regions may be termed "subregions" as they are separate regions of the first and second electrical connection region respectively. As another example, the first electrode region 504b is associated with the first electrical connection region 508b and the second electrical connection region 510b. As another example, the first electrode region 504c is also associated with the first electrical connection region 508b and the second electrical connection region 510c.

It can therefore be seen that, although the specific first and second electrical connection region associated with a first electrode region is unique, a first electrical connection region can be associated with multiple first electrode regions. In the same manner, it can be seen that each second electrical connection region 510a-510d may be associated with more than one of the first electrode regions. In the example of FIG. 5, the second electrical connection region 510a is associated with both the first electrode region 504a and the first electrode region 504b. As also shown in FIG. 5, a specific first electrical connection region (e.g. 508b) may be associated with two different electrode regions (e.g. 504b and 504c), and a specific second electrical connection region (e.g. 510a) may be associated with two different electrode regions (e.g. 504a and 504b)—however, one of these electrode regions (e.g. 504b in this case) may be shared by both the first and second electrical connection regions (e.g. 508b and 510a in this case).

In other words, the first electrical connection region 508b is associated with a first group of first electrode regions, the first group being the first electrode regions 504b and 504c. The second electrical connection region 510a is associated with a second group of the first electrode regions, the second group being the first electrode regions 504a and 504b. Therefore, in this case the first electrode region 504b is in both the first group and the second group. Of course, the size of each group may change, and may include more than two first electrode regions. The second electrode regions, which correspond to the first electrode regions, may therefore be similarly grouped.

In this embodiment, the pressure-sensitive ink layers 506a-506h may have different thicknesses. For example, the pressure-sensitive ink layers 506a-506d may have a first thickness, and the pressure-sensitive ink layers 506e-506h may have a second thickness which is different from the first thickness. As has been described previously, a thicker pressure-sensitive ink layer has a greater piezo resistive range and can therefore allow measurement of higher forces. Of course, the thickness of the pressure-sensitive ink layers could vary in any way, and indeed each of the layers 506a-506h could have different thicknesses. In this manner, the pressure-sensitive sheet 700 may be customised to the particular application.

The second half 600 is similar to the second half 200 and layered in the same way. Instead of the second electrode region 204, the second half 600 has a plurality of second electrode regions 604a-604h. Each of the second electrode regions 604a-604h corresponds to a particular one of the first electrode regions 504a-504h of the first half 500. Each of the second electrode regions 604a-604h has one or more corresponding second tab regions 608a-608h adjacent its respective second electrode region and electrically connected thereto. Such an electrical connection may again by provided by one or more track lines or via direct abutment, in the same manner as described in relation to the second half 200. As for the second half 200, each of the second electrode regions 604a-604h is covered by a respective pressure-sensitive ink layer 606a-606h. As for the first half 500, the pressure-sensitive ink layers 606a-606h of the second half 600 may have the same thickness or different thicknesses. Those features optional for the sheet 300 are also optional here.

FIG. 7 shows the first half 500 and the second half 600. These two halves come together to form a pressure-sensitive sheet 700 in the same manner as previously described in FIG. 3. Again, electrically conductive tape may optionally be used.

As has been mentioned previously, each of the first electrode regions 504a-504h is associated with a unique combination of the plurality of first electrical connection regions 508a-508e and the second electrical connection regions 510a-510d. "Associated" in this context means that the first electrode region in question is electrically connected to, or arranged to be electrically connected to, the particular first or second electrical connection region. It can be seen in FIG. 5 that the first electrical connection region 508a is electrically connected to the first electrode region 504a by way of a conductive track extending directly therebetween on the substrate 102, and the first electrical connection region 508b is electrically connected to both the first electrode region 504b and the first electrode region 504c by way of separate conductive tracks on the substrate 102. The second electrical connection region 510a however is arranged to be electrically connected to both the first electrode regions 504a and 504b, by virtue of the interaction between the second electrical connection region 510a, or one or more first tabs 512 thereof, the one or more second tab regions 608a and 608b on the second substrate 202, and the pressure-sensitive inks 606a and 606b (if present).

In the first half 500, the first electrical connection regions 508a-508e are directly electrically connected to the first electrode regions 504a-504h via conductive tracks on the substrate 102. The second electrical connection regions 510a-510d, however, are only arranged to be electrically connected to the first electrode regions 504a-504h via the interaction with the pressure-sensitive ink as previously described.

Electrical connection of the circuit elements to each of the first and second electrical connection regions 508a-e, 510a-d, which serve as circuit terminals, may be at various locations on the sheet 700. For example, the electrical connection may be made directly to at least one of the first electrical connection regions 508a-e and at least one of the second electrical connection regions 510a-d, a various locations along opposite edges of the sheet 700. For example, if the sheet 700 is to be used to detect a force and/or pressure applied to a location corresponding to the location of the electrodes 504b and 604b, the electrical connection regions 508b and 510a serve as the circuit terminals. If the sheet 700 is also to be used to detect a force applied to another location, one or more of the other electrical connection regions may serve as circuit terminals. For example, if detection at a location corresponding to the electrodes 504c and 604c is also desired, the second electrical connection region 510b provides the necessary additional circuit terminal.

In the above example, three circuit terminals are therefore required to allow force detection at two different electrode regions. Therefore, it can be seen that more specific location detection of an applied force can be achieved by choosing appropriate connection points/circuit terminals along the edges of the sheet 700. The sheet 700, unlike the sheet 300, therefore allows for specific location detection by associating each corresponding first and second electrode region with a unique pair of first and second electrical connection regions.

Although the above example allows for a single first or second electrical connection region to be associated with two first electrode regions, this is merely an example and indeed a single first or second electrical connection region may be associated with more than two first electrode regions. Conversely, each first or second electrical connection region may only be associated with a single first electrode region.

It can be seen in the example of FIG. 5 that the number of first electrical connection regions is 5, the number of second electrical connection regions is 4, and the number of first electrodes is 8. This difference is due to some of the first and second electrical connection regions being associated with more than one first electrode region. Indeed, any number of first electrode regions may be associated with any number of first or second electrical connection regions, and the number of first and second electrical connection regions may be different to each other. In order to allow specific location detection across the sheet 700, all that is required is that at least one of the first electrode regions is associated with a unique pair of first and second electrical connection regions, and another of the first electrode regions is associated with a different unique pair of first and second electrical connection regions. As has been described, one of the first or second electrical connection regions may form part of, and by shared by, both unique pairs since an electrical connection of one pair may be shared with another pair.

Although the pressure-sensitive sheet 700 has been described as having a plurality of connection points along opposite edges of the sheet, the plurality of connection points may instead or additionally be at one or both ends of the sheet. For example, each first and second electrical connection region may be connected via a track to one end of the sheet. The end of the sheet may therefore have a plurality of connection points, each connection point connecting to one of the first and second electrical connection regions. In this manner, all of the electrical connection points of the sheet 700, and therefore all of the circuit terminals, may be located at one edge of the sheet. Alternatively, one or more other locations may be used for the connection points, which may be determined depending on the intended use of the pressure-sensitive sheet 700.

Like the embodiment of FIGS. 1-3, the sheet 700 may also form part of a modular system in a similar manner. In particular, a male sheet may have the second electrical connection regions 510a-d on the right-hand side, and the female sheet (when connected to the male sheet) may also have the second electrical connection regions 510a-d on the left-hand side. In this manner, the second electrical connection regions 510a-d of the male sheet electrically connect, either directly or via conductive tape as previously described, to the second electrical connection regions 510a-d of the female sheet. In the same way, the first electrical connection regions 508a-e of the male sheet may connect to the first electrical connection regions 508a-e of the female sheet. This ensures alignment of the electrical connection regions of different sheets.

The pressure-sensitive sheet 700 may therefore be used in a similar manner to the pressure-sensitive sheet 300, with the additional benefits of being able to determine a pressure/force location, as well as a magnitude, on different sensors within a single sheet.

Figure 8:
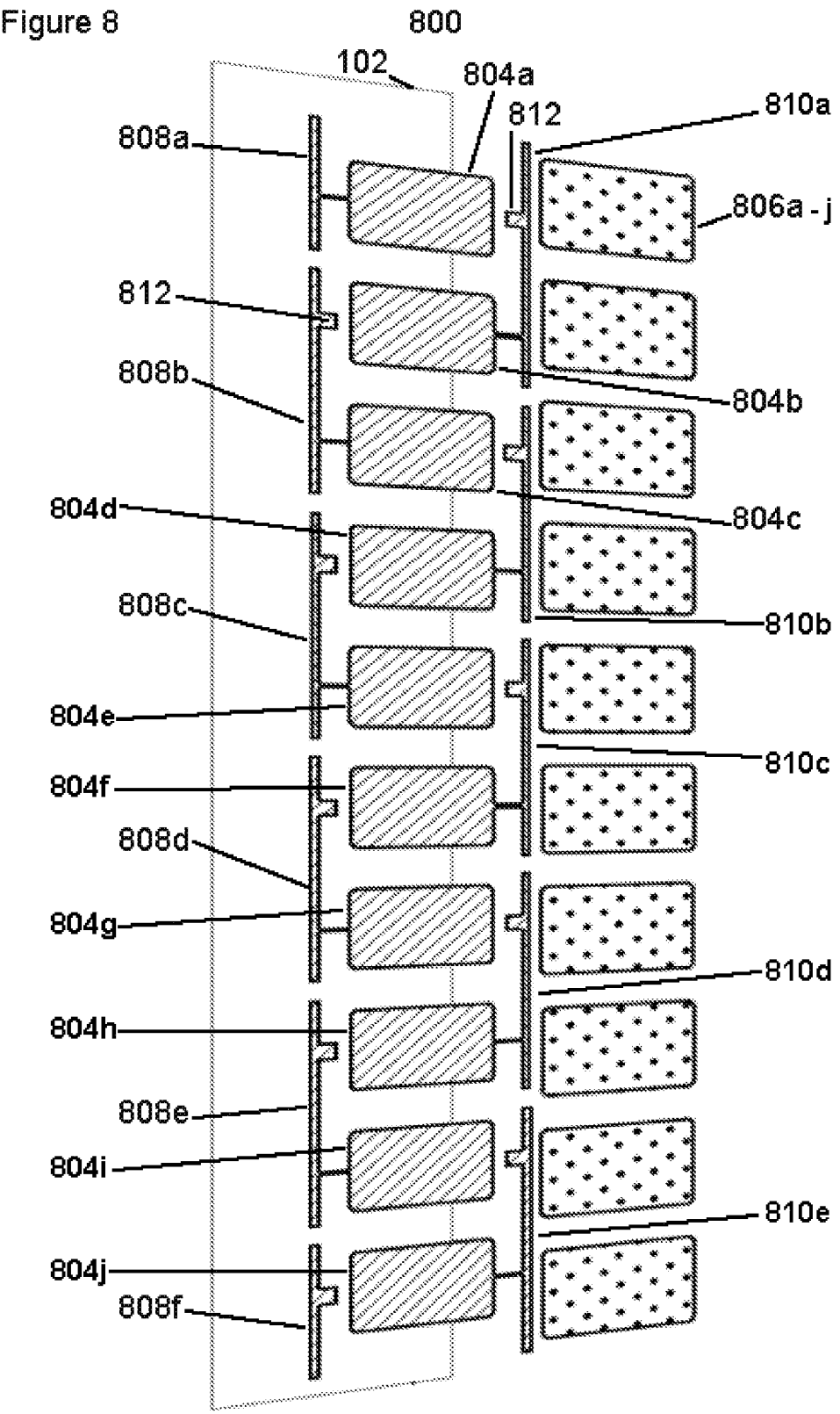
FIG. 8 shows a first pressure-sensitive sheet half 800 according to a third embodiment.
Figure 9:
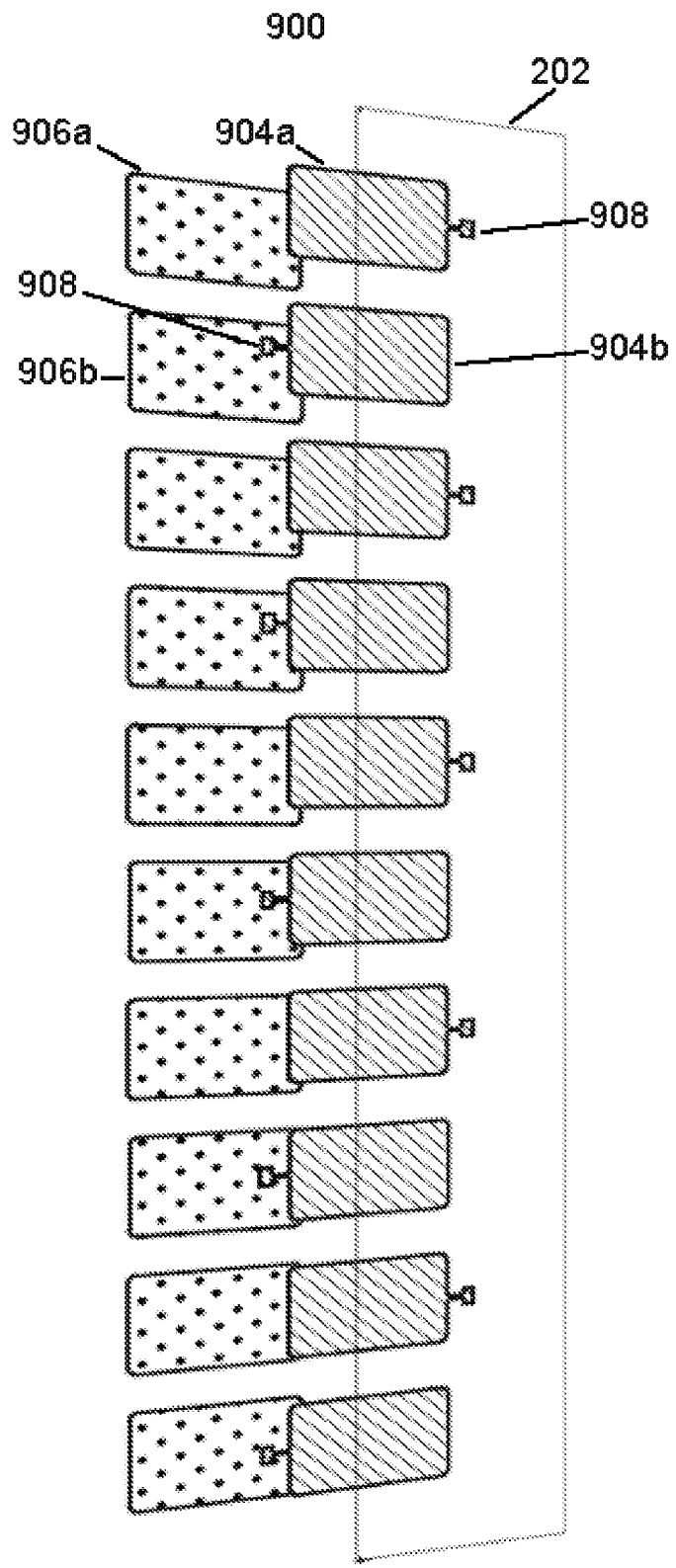
FIG. 9 shows a second pressure-sensitive sheet half 900 according to the third embodiment.
Figure 10:
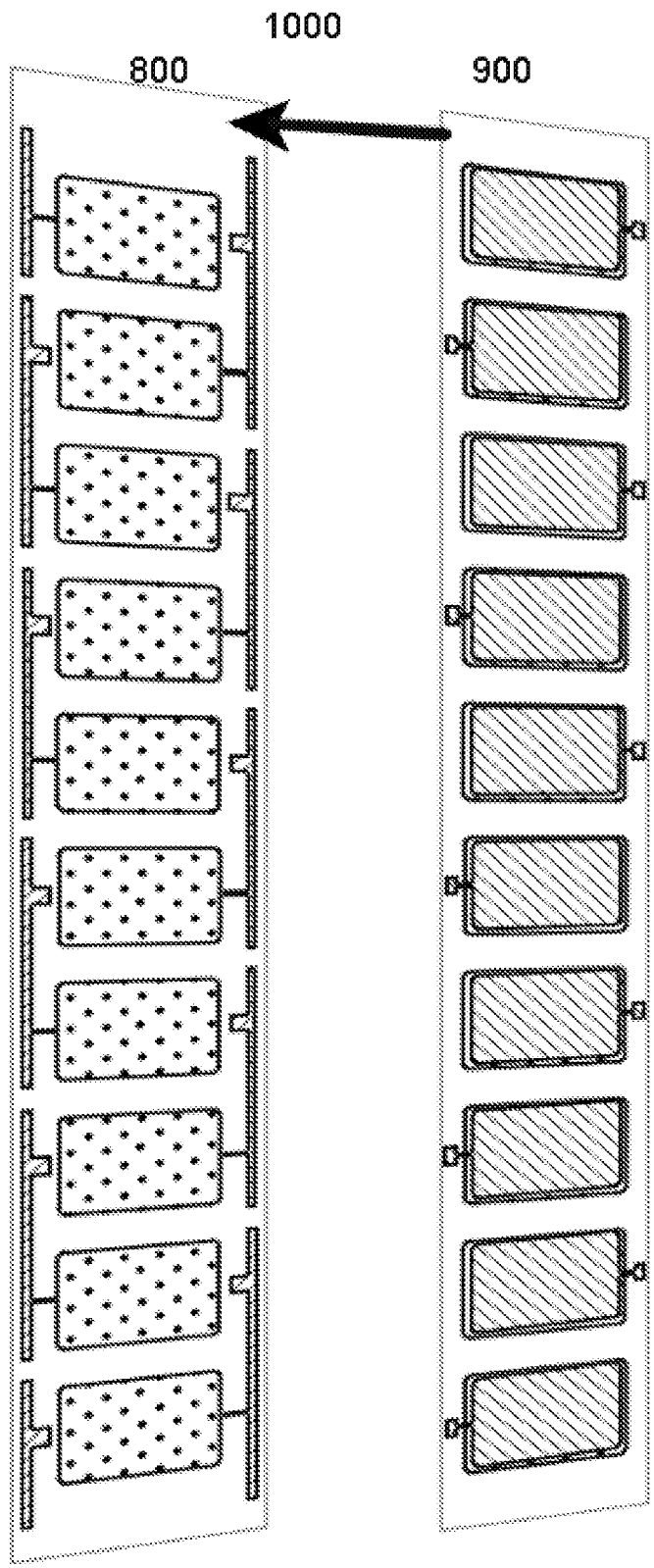
FIG. 10 shows a pressure-sensitive sheet 1000 formed of the first pressure-sensitive sheet half 800 and the second pressure-sensitive sheet half 900 of the third embodiment.

FIGS. 8 to 10 show a third embodiment of a pressure-sensitive sheet formed of two sheet halves.

A pressure-sensitive sheet 1000 of the third embodiment is made up of a first half 800, shown in FIG. 8, and a second half 900, shown in FIG. 9. The pressure-sensitive sheet 1000 is a variant of the pressure-sensitive sheet 700.

The first half 800 and the second half 900 are almost identical to the first half 500 and the second half 600, and are layered in the same way. The only difference between the first half 800 and the first half 500 is the specific arrangement of the first and second electrical connection regions, and the only difference between the second half 900 and the second half 600 is the position of the tab regions. Instead of only the first electrical connection regions 508a-e being directly electrically connected to the first electrode regions 504a-h on the substrate 102, as in the first half 500, at least some of both the first electrical connection regions 808a-f and the second electrical connection regions 810a-e are directly electrically connected to the first electrode regions 804a-j on the substrate 102.

As shown in FIG. 8, the first electrical connection region 808b, for example, is associated with both the first electrode regions 804b and 804c. The association with the first electrode region 804c is via a direct electrical connection by a conductive track on the substrate 102. The association with the first electrode region 804b however is via the interaction of the first electrical connection region 808b, or a tab 812 thereof, with a tab 908 directly electrically connected to the second electrode region 904b of the second substrate 202 and the pressure-sensitive ink 906b. Similarly, the second electrical connection region 810a is associated with the first electrode region 804b via a direct electrical connection by a conductive track on the substrate 102, and the second electrical connection region 810a is associated with the first electrode region 804a via the interaction of the second electrical connection region 810a, or a tab 812 thereof, the tab 908 directly electrically connected to the second electrode region 904a of the second substrate 202, and the pressure-sensitive ink 906a. This concept extends along the length of the sheet, as shown in FIGS. 8 and 9. FIG. 10 shows the pressure-sensitive sheet 1000 formed of the first half 800 and the second half 900.

Sheet 1000 may also form part of a modular system in the same way as the sheet 700. In particular, a male sheet may have the second electrical connection regions 810a-e on the right-hand side, and the female sheet may also have the second electrical connection regions 810a-e on the left-hand side. In this manner, the second electrical connection regions 810a-e of the male sheet electrically connect, either directly or via conductive tape as previously described, to the second electrical connection regions 810a-e of the female sheet. In the same way, the first electrical connection regions 808a-f of the male sheet may connect to the first electrical connection regions 808a-f of the female sheet The pressure-sensitive sheet 1000 is an alternative arrangement of the pressure-sensitive sheet 700, and may therefore also be used to detect both force/pressure location, as well as magnitude, on different sensors within a single sheet.

FIGS. 11 and 12 show a fourth embodiment of a pressure-sensitive sheet formed of two sheet halves.

A pressure-sensitive sheet 1250 of the fourth embodiment is made up of a first half 1100 and a second half 1200, both shown in FIG. 11. The pressure-sensitive sheet 1250 is a variant of the pressure-sensitive sheet 300.

The structure and layering of each half of the pressure-sensitive sheet 1250 is largely the same as that of the pressure-sensitive sheet 300, with some differences. Unlike the first half 100, the first half 1100 does not have the second electrical connection region 110. Instead, the second electrical connection region 110 is located on the second half 1200. Unlike the second half 200, as well as having the electrical connection region 110, the second half 1200 does not have the second tab regions 208.

As can be seen in FIG. 11, the first electrical connection region 108 of the first half 1100 is directly electrically connected to the first electrode region 104, for example by one or more track lines on the same layer as the first electrode region 104 and the first connection region 108, the one or more track lines extending between the first connection region 108 and the first electrode region 104. This is the same as in the first half 100.

As can also be seen in FIG. 11, The second electrical connection region 110 is directly electrically connected to the second electrode region 204, for example by one or more track lines on the same layer as the second electrode region 204 and the second connection region 110, the one or more track lines extending between the second connection region 110 and the second electrode region 204.

FIG. 12 shows another important difference between the pressure-sensitive sheet 300 and the pressure-sensitive sheet 1250. In the pressure-sensitive sheet 300, in order to ensure that the first and second electrical connection regions 108, 110 are exposed, the second substrate 202 is a different shape to the first substrate 102. As such, second substrate 202 of the pressure-sensitive sheet 300 may be narrower in the X direction than the first substrate 102 such that the second substrate 202 is located between the first and second electrical connection regions 108, 110. However, this need not be the case for the pressure-sensitive sheet 1300. Instead, the two halves 1100 and 1200 are located on top of each other such that the substrates 102 and 202 are not aligned.

As shown in FIG. 12, the arrangement of the two halves 1100 and 1200 is such that the first electrical connection region 108 is exposed and not covered by the second substrate 202, and the second electrical connection region 110 is exposed and not covered by the first substrate 102. However, the electrode regions 104 and 204 may still be directly aligned on top of each other (with one or more other layers in between, as previously described in relation to the pressure-sensitive sheet 300). To achieve this, the substrates 102 and 202 are laterally offset from each other in the X direction such that the first electrical connection region 108 is located along an edge of the first substrate 102 that extends beyond the corresponding edge of the second substrate 202, and the second electrical connection region 110 is located along an edge of the second substrate 204 that extends beyond the corresponding edge of the first substrate 102.

It can be seen that the pressure-sensitive sheet 1250 is particularly suited to form part of a modular system of the pressure-sensitive sheet 1250. Specifically, there is no requirement for male and female variants of the pressure-sensitive sheet 1250. Looking at FIG. 12, it can be seen that the first electrical connection region 108 is exposed facing in one direction, i.e. "up" and out from the page, and the second electrical connection region 110 is exposed facing in the opposite direction, i.e. "down" and into the page. To form the modular system, one pressure-sensitive sheet 1250 can be placed next to another of the pressure-sensitive sheet 1250 such that the second electrical connection region 110 of one sheet is in electrical contact with the first electrical connection region 108 of another sheet. In this manner, a modular system can be formed of any number of the pressure-sensitive sheet 1250 of FIG. 12.

In the same manner as described above in relation to the male and female variants of the pressure-sensitive sheet 300, adhesives can be applied as necessary to adhere the pressure-sensitive sheet 1250 to an object. Additionally, electrically conductive adhesive may be applied between the first electrical connection region 108 of one sheet and the second electrical connection region 110 of another sheet.

Figure 14:
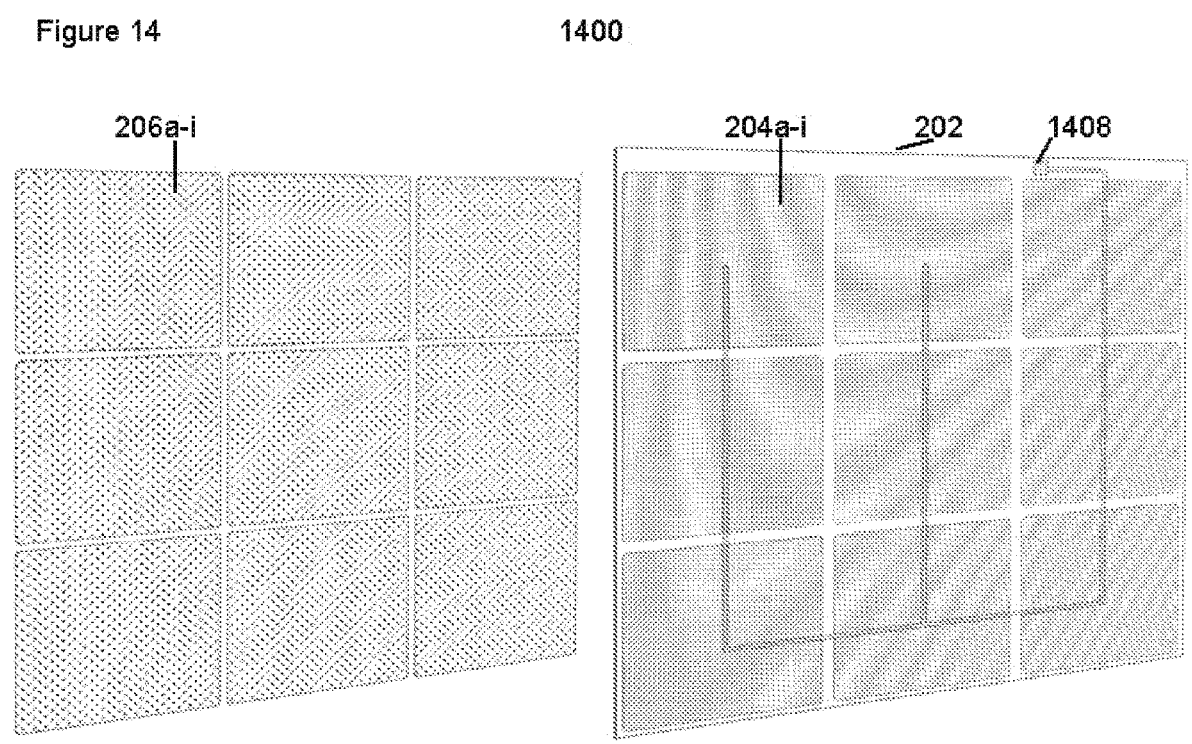
FIG. 14 shows a second pressure-sensitive sheet half 1400 according to the fifth embodiment.
Figure 15:
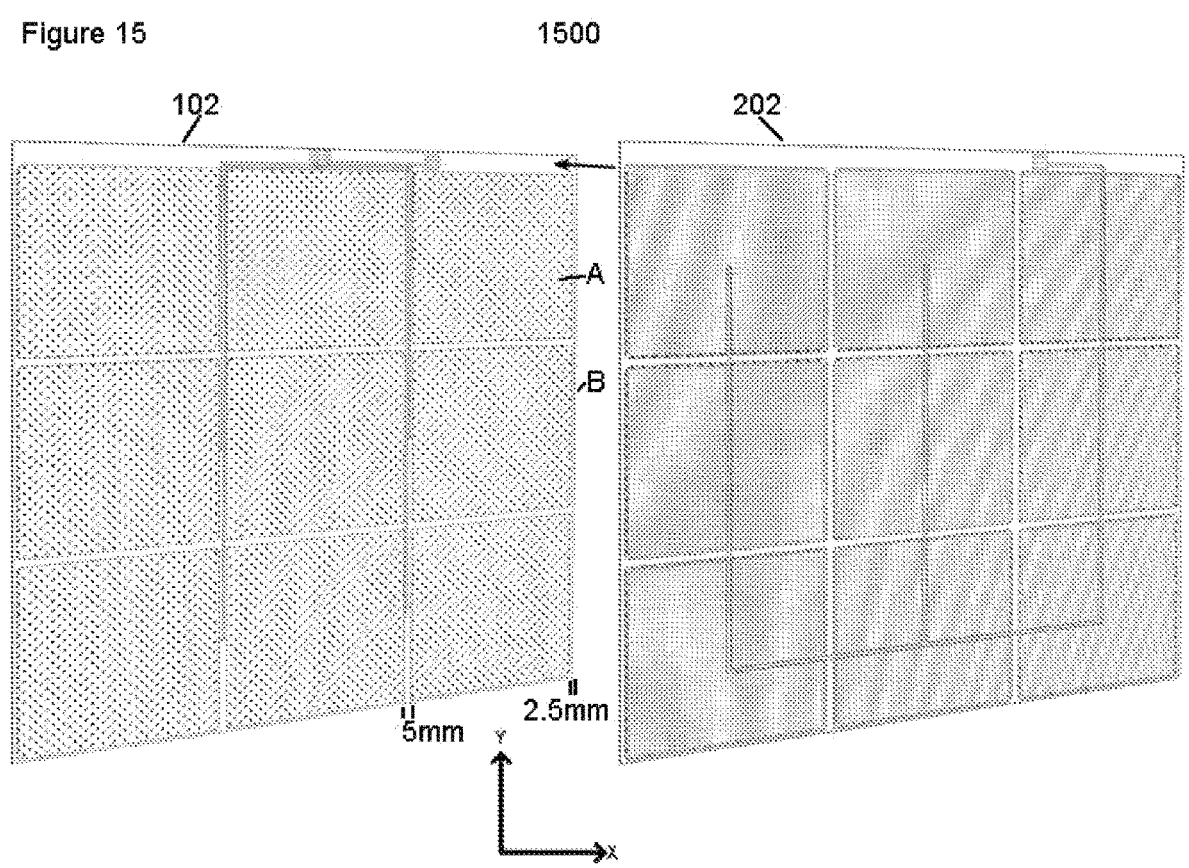
FIG. 15 shows an exploded view of a pressure-sensitive sheet 1500 according to the fifth embodiment.

FIGS. 13 to 15 show a fifth embodiment of a pressure-sensitive sheet formed of two sheet halves.

A pressure-sensitive sheet 1500 of the fifth embodiment, shown in FIG. 15, is made up of a first half 1300, shown in FIG. 13, and a second half 1400, shown in FIG. 14.

The layering structure of the pressure-sensitive sheet 1500 is also similar to the pressure-sensitive sheet 700 or 1000. Notably, the first half 1300 comprises an array of first electrode regions 104a-i in a grid pattern, and the second half 1400 comprises a corresponding array of second electrode regions 204a-i. Although a 3×3 grid array will be described in this embodiment, any array structure may be used. For example, 2×2, 2×3 etc. or any other array structure may be used.

Corresponding layers of pressure-sensitive ink 106a-i are provided on the first electrode regions 104a-i, and corresponding layers of pressure-sensitive ink 206a-i are provided on the second electrode regions 204a-i. Any additional layers, and whether any layers are optional, is the same as for the pressure-sensitive sheet 300, 700 or 1000.

In the first half 1300, a hub region 1320 is provided at one edge of the first half 1300. The hub region 1320 comprises a first electrical connection region 1308 and a second electrical connection region 1310.

The first electrical connection region 1308 provides a plurality of electrical connection points, each electrical connection point corresponding to one of the first electrode regions 104*a-i*. The first electrical connection region 1308 is therefore electrically connected to each of the first electrode regions 104*a-i* via corresponding electrically conductive tracks running from the electrical connection region 1308 to each first electrode region 104*a-i*.

The second electrical connection region 1310 provides a single electrical connection point to the plurality of second electrode regions 206*a-i*, as will become clear. To achieve this, the second electrical connection region 1310 is electrically connected to a first tab region 1312 provided on the first substrate 102. Such an electrical connection may be via a conductive track running between the second electrical connection region 1310 and the first tab region 1312.

In the second half 1400, a second tab region 1408 is located on the substrate 202 and located such that, when the first half 1300 and the second half 1400 are placed together to form the pressure-sensitive sheet 1500, the second tab region 1408 is in electrical contact with the first tab region 1312. The second tab region 1408 is directly electrically connected to all of the second electrodes 204*a-i* via one or more conductive tracks. As shown in FIG. 14, a conductive track extends from the second tab region 1408 across to or to all of the second electrode regions 204*a-i*, forming a side-on "E" shape. However, the conductive track may take any shape that electrically connects the second electrode regions 204*a-i* to the second tab region 1408. In this manner, the second tab region 1408 provides a single connection point to all of the second electrode regions 204*a-i*. Similarly, as the second tab region 1408 is electrically connected to the first tab region 1312, the second electrical connection region 1310 of the hub region 1320 provides a single electrical connection point that provides an electrical connection to all of the second electrode regions 204*a-i*.

It can therefore be seen that the hub region 1320 provides a single electrical connection point to the plurality of second electrode regions 206*a-i*, and a plurality of electrical connection points to the plurality of first electrode regions 104*a-i*, via the second and first electrical connection regions respectively. Beneficially, all of the electrical connection points are therefore located on the same substrate, i.e. the first substrate 102 in this case.

The hub region 1320 provides circuit terminals for incorporating the pressure-sensitive sheet 1500 in an electrical circuit to detect a pressure/force applied to the sheet, such as has been previously described for the other embodiments. The second electrical connection region 1310 provides one circuit terminal, and one or more of the electrical connection points of the first electrical connection region 1308 provides another circuit terminal. As the skilled person would understand, since the second electrical connection region 1310 provides an electrical connection to all of the second electrodes 204*a-i*, one or more particular electrical connection points of the first connection region 1308 can be chosen as another circuit terminal depending on the particular region of the pressure-sensitive sheet 1500 required to be activated.

The pressure-sensitive sheet 1500 may also form part of a modular system of pressure-sensitive sheets 1500. This may be achieved by selecting a distance between an edge of the sheet and a first electrode to be half the distance between individual first electrode regions. For example, looking at FIG. 15, a distance in the x-direction between adjacent first electrode regions may be 5 mm. A distance between a right-most first electrode region (A), located adjacent a right-most edge (B) of the pressure-sensitive sheet 1500 (which is also an edge of the substrate 102), and the right-most edge (B) of the pressure-sensitive sheet 1500 may be 2.5 mm. Then, a distance between a left-most first electrode region, located adjacent a left-most edge of a different pressure-sensitive sheet 1500, and the left-most edge of the different pressure sensitive sheet 1500 may also be 2.5 mm. As such, when both of the pressure-sensitive sheets 1500 are laid side-by-side, there is a uniform distance between first electrode regions in the x-direction.

This principle may extend to the y-direction, and indeed all first electrodes may be uniformly separated by a distance of 5 mm and there may be a uniform perimeter of 2.5 mm between first electrode regions and more than one edge of the pressure-sensitive sheet 1500. This allows greater modularity as multiple of the pressure-sensitive sheet 1500 may be placed adjacent to each other in different configurations, while maintaining a distance of 5 mm between first electrode regions across the multiple sheets.

Of course, the values of 5 mm and 2.5 mm are merely examples, and any distances may be used depending on the specific implementation.

One of the benefits of the pressure-sensitive sheet 1500 is that an increased number of sensors may be incorporated into a single sheet. The increased surface area of the sheet 1500 facilitates the bonding of the sheet 1500 to a surface. The sheet 1500 is suitable for applications in which a permanent, semi-permanent or increased strength bonding is desired, for example for long term use, or for applications in which a temporary bond is desired. For example, the bond strength could be such as to allow an easy attachment and detachment (and, possibly, re-attachment) of the sheet 1500 from an object.

As an example use, the sheet 1500 could be applied to machine parts for the purposes of monitoring for damage during transit of such parts from a manufacturing location to an assembly location. Such parts may be aircraft parts, and the monitoring of damage facilitates detection of suitability (i.e. excessive damage) of such parts at the assembly location without necessarily requiring a manual inspection, greatly simplifying the quality control process. As such, time and costs are saved in the quality control process.

As another example use, the sheet 1500 could be applied around a leading edge of an aircraft wing, helicopter blade or other aviation part to monitor for damage to such a part during use or transit. The sheet 1500 is particularly suited for such use due to its flexibility and array of sensors that may therefore provide force detection around and on the leading edge.

A single or a plurality of the sheet 1500 could be provided on a larger sheet, each sheet 1500 being removable from the larger sheet via peeling. For example, columns and/or rows of individually peelable sheets 1500 could be provided on a single larger sheet. Accordingly, the adhesive adhering the sheet 1500 to the larger sheet may have a bond strength to allow such peeling.

FIGS. 16 to 19 show a sixth embodiment of a pressure-sensitive sheet formed of two sheet halves.

Figure 16:
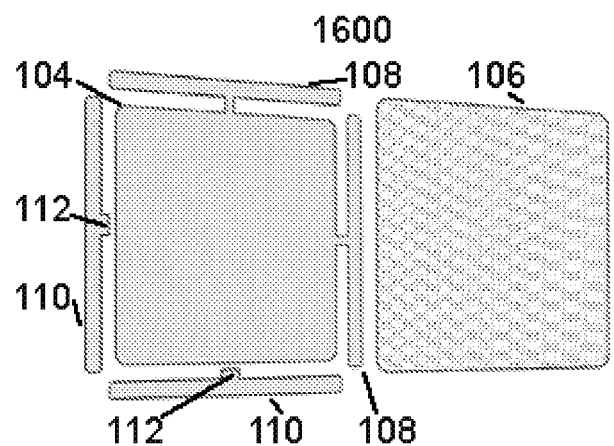
FIG. 16 shows a first pressure-sensitive sheet half 1600 according to a sixth embodiment.
Figure 17:
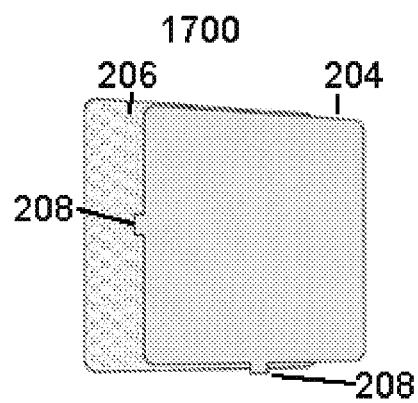
FIG. 17 shows a second pressure-sensitive sheet half 1700 according to the sixth embodiment.
Figure 18:
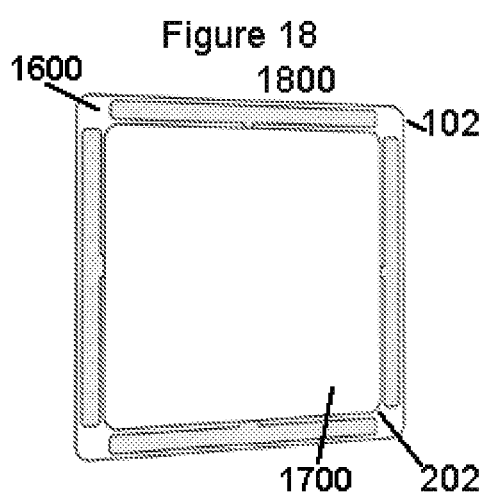
FIG. 18 shows a pressure-sensitive sheet 1800 formed of the first pressure-sensitive sheet half 1600 and the second pressure-sensitive sheet half 1700 of the sixth embodiment.

A pressure-sensitive sheet 1800 of the sixth embodiment, shown in FIG. 18, is made up of a first half 1600, shown in FIG. 16, and a second half 1700, shown in FIG. 17.

The structure and layering of each half of the pressure-sensitive sheet 1800 is largely the same as that of the pressure-sensitive sheet 300, with some differences. Unlike the first half 100, the first half 1600 is rectangular or square, and comprises two first electrical connection regions 108 and two second electrical connection regions 110. The substrate 102, while present, is omitted from FIG. 16. The first half 1600 comprises four edges. One of the first electrical connection regions 108 extends along a top edge, and one of the first electrical connection regions 108 extends along a right edge. As for the pressure-sensitive sheet 1300, these first electrical connection regions 108 are directly electrically connected to the first electrode 104. One of the second electrical connection regions 110 extends along a left edge, and one of the second electrical connection regions 110 extends along a bottom edge.

Unlike the second half 200, the second half 1700 is also rectangular or square, and comprises tab regions 208 on a left and a bottom edge. The substrate 202, while present, is omitted from FIG. 17. The second tab regions 208 each extend in a direction towards the corresponding location of the second electrical connection regions 110 of the first half 1600. In this example, one of the second tab regions 208 extends towards the bottom edge and the other of the second tab regions 208 extends towards the left edge.

Like the second half 200, the second substrate 202 (and therefore the second electrode 204) of the second half 1700 is smaller than the first substrate 102 of the first half 1600. This allows the second half 1700 to be located on top of the first half 1600 and within the first and second electrical connection regions 108, 110. As can be seen in FIG. 18, the second half 1700 does not cover any of the first or second electrical connection regions 108, 110. These regions are therefore exposed.

Figure 19:
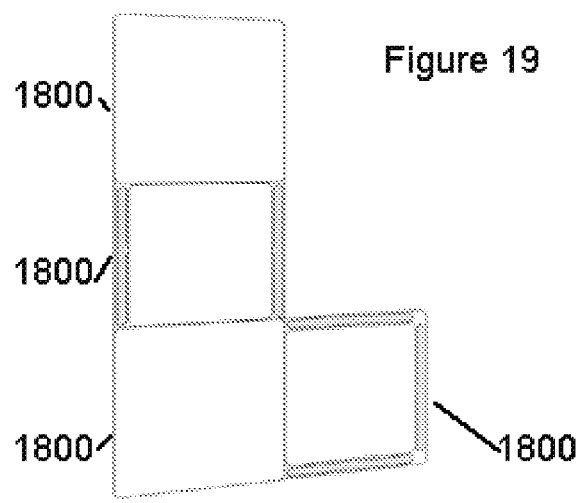
FIG. 19 shows a modular system the pressure-sensitive sheet 1700 of the sixth embodiment.

This embodiment is therefore particularly suitable for use in a modular system. Looking at FIG. 19, it can be seen that multiple of the pressure-sensitive sheet 1800 may be placed side-by-side to form a modular system of pressure-sensitive sheets 1800. This is achieved in a similar manner to that shown in FIG. 4, and indeed the additional layers and adhesives described in relation to that figure can also be used here. As can be seen in FIG. 19, the flexibility of the modular system using the pressure-sensitive sheet 1800 is very high at the sheets may be readily placed like tiles to form a mosaic of pressure-sensitive sheets 1800 as desired.

FIGS. 20-22 show alternative arrangements of the pressure-sensitive sheet 1800. As shown in FIG. 20, the first half 1600 may have a single first electrical connection region 108 extending along one edge, and the second half 1700 may have a single second electrical connection region 110 extending along a different edge. In the case of FIG. 20, the edges are opposite edges of a rectangular or square sheet, however other edges may be chosen.

The direct electrical connection of each respective electrical connection region 108, 110 to a respective electrode region 104, 200 in FIG. 21 is shown as a single track, however there may be multiple tracks connecting each electrical connection region to its respective electrode region. This can be seen in FIG. 21, for example, which shows two tracks connecting each electrical connection region to its respective electrode region.

Alternatively, each electrical connection region 108, 110 itself may be formed of more than one subregion, each subregion having its own track directly connecting the subregion to an electrode region. This is shown in FIG. 22, for example, which shows first electrical connection subregions 108*a* and 108*b*, and second electrical connection subregions 110*a* and 110*b*. Each subregion 108*a* and 108*b* is electrically connected to the first electrode region 104 via a single conductive track, and each subregion 110*a* and 110*b* is electrically connected to the second electrode region 204 via a single conductive track. Although a single track is shown, there may be multiple tracks per subregion.

By providing multiple connections, via tracks or otherwise, from a single electrode region to respective electrical connection regions, a resistance differential could be measured thereby providing the possibility of determining a location of force, and optionally a force shape, within a single pair of electrode regions 104, 204 (i.e. within a single sensor). For example, the arrangement of FIG. 22 could be used as part of a 4-way wire system in which each subregion 108*a*, 108*b*, 110*a*, 110*b* is connected to an analysis system for the purposes of measuring a resistance differential across the electrode regions 104, 204, as the skilled person would understand. Indeed, such a system may be used with the arrangement of FIG. 21 as well, or indeed any arrangement having multiple electrical connections to a single electrode.

Figure 23:
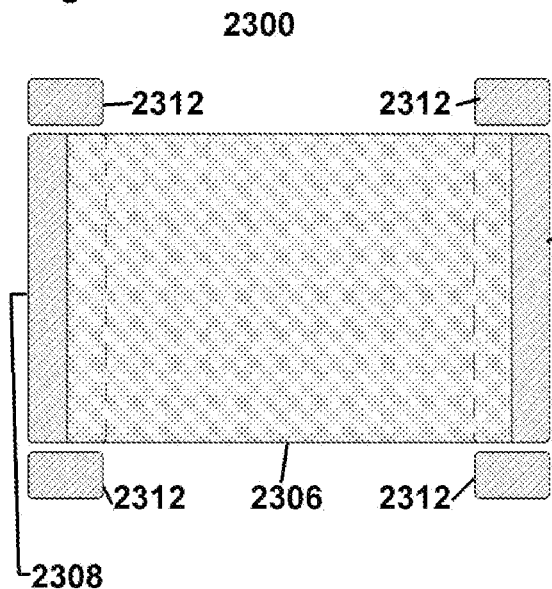
FIG. 23 shows a first pressure-sensitive sheet half 2300 according to a seventh embodiment.
Figure 24:
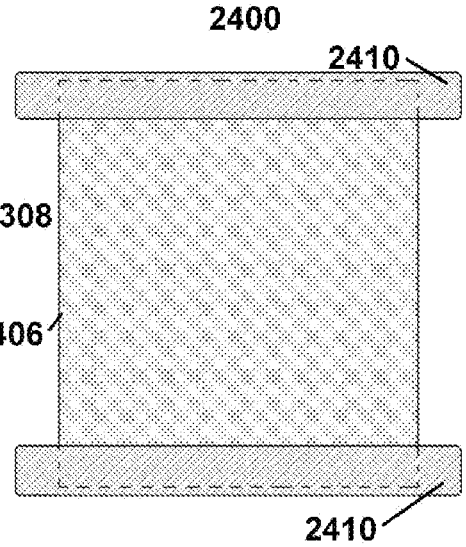
FIG. 24 shows a second pressure-sensitive sheet half 2400 according to the seventh embodiment.
Figure 25:
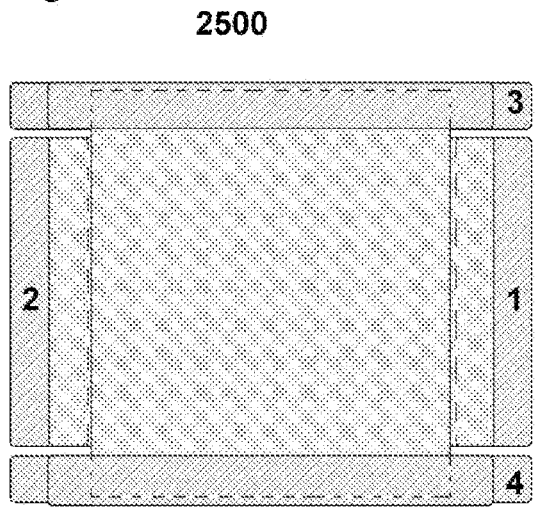
FIG. 25 shows a pressure-sensitive sheet 2500 formed of the first pressure-sensitive sheet half 2300 and the second pressure-sensitive sheet half 2400 of the seventh embodiment.

FIGS. 23-25 show another arrangement of a pressure-sensitive sheet which is particularly suitable to be part of such a 4-way wire system. The pressure-sensitive sheet 2500, shown in FIG. 25, is formed of a first half 2300 (FIG. 23) and a second half 2400 (FIG. 24). The first half 2300 comprises a first substrate having two first electrical connection regions 2308 each located along an opposite edge of the first half 2300. Between and overlapping both first electrical connection regions 2308 is a pressure-sensitive ink layer 2306. The first half 2300 also comprises a plurality of tab regions 2312 electrically separated from the first electrical connection regions 2308. The tab regions 2312 may be located at corner regions of the first half 100, however other regions may be used.

The second half 2400 comprises a second substrate having two second electrical connection regions 2410 each located along an opposite edge of the second half 2400. Importantly, the edges along which each second electrical connection region 2410 is located are different from the edges along which each first electrical connection region 2308 is located. Comparing FIGS. 23 and 24, for example, it can be seen that the first electrical connection regions 2308 are located along opposite side edges of the sheet 2500, and the second electrical connection regions 2410 are located along opposite top and bottom edges of the sheet 2500.

Much like the first half 2300, the second half 2400 also comprises a pressure-sensitive ink layer 2406 between and overlapping both second electrical connection regions 2410. Looking now to FIG. 25, in the assembled sheet 2500 the second electrical connection regions 2410 overlap the tab regions 2310 such that all electrical connection terminals of the sheet 2500 are located on the first half. In other words, all electrical connection terminals of the sheet 2500 are located on the same substrate. As mentioned previously, this facilitates connection of the sheet 2500 to other circuit elements.

As shown in FIG. 25, the location of the two of the tab regions 2310, termed "top" tab regions, may correspond to the location of a corresponding top second electrical connection region 2410 such that the top second electrical connection region 2410 is electrically connected to at least one of the top tab regions when the sheet 2500 is assembled. Similarly, the location of a different two of the tab regions 2310, termed "bottom" tab regions, may correspond to the location of a corresponding bottom second electrical connection region 2410 such that the bottom second electrical connection region 2410 is electrically connected to at least one of the top tab regions when the sheet 2500 is assembled.

The first half 2300 may be constructed by first applying the tab regions 2310 and the first electrical connection regions 2308 to the first substrate, and then applying the piezo-resistive layer 2306. Optionally, a carbon conductive layer may be applied just before the piezo-resistive layer 2306, such that the carbon conductive layer is between the first electrical connection regions 2308 and the piezo-resistive layer 2306. The carbon conductive layer may have substantially the same shape as the piezo-resistive layer 2306 such that is also overlaps the first electrical connection regions 2308. Beneficially, the carbon conductive layer is electrically conductive and, due to the limitations of piezo-resistive ink, allows the size of the sheet 2500 to be increased by increasing the area of the piezo-resistive layer 2306.

The second half 2400 may be constructed by first applying the second electrical connection regions 2410 to the second substrate, and then applying the piezo-resistive layer 2406. Optionally, a carbon conductive layer may also be included between the piezo-resistive layer 2406 and the second electrical connection regions 2410, for the same reasons as described above for the first half 2300.

The piezo-resistive layers may be formed of piezo-resistive ink, as previously described, and such ink may be electrically conductive in the X-direction and the Y-direction. Optionally, such ink may also be electrically conductive in the Z-direction.

Due to this arrangement of the sheet 2500, the sheet 2500 may be used as part of a 4-way wire system in which 4 different subregions are connected to an analysis system for the purposes of measuring a resistance differential across the piezo-resistive layers 2306, 2406, as the skilled person would understand. As an example, the subregions labelled 1, 2, 3 and 4 shown in FIG. 25 may be used for the 4-way wire system. In other words, each of the first and second electrical connection regions, or a corresponding tab region thereof, is used as one of the circuit terminals for the 4-way wire system.

Figure 26:
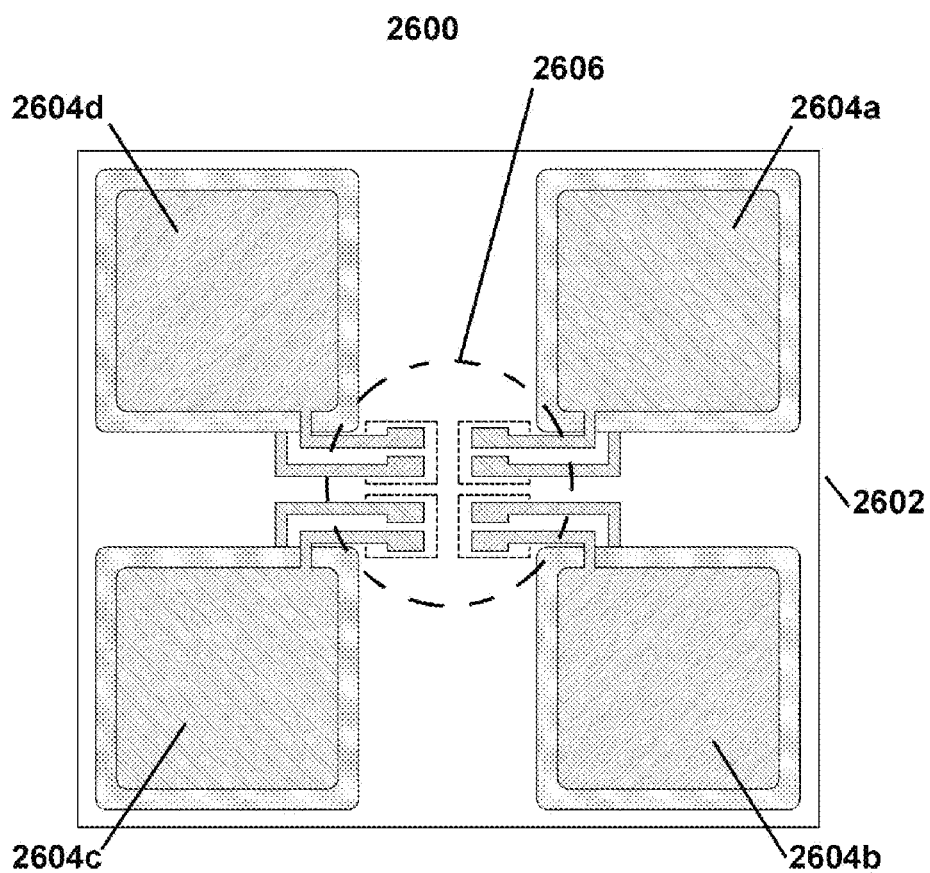
FIG. 26 shows another variant of a pressure-sensitive sheet.

FIG. 26 shows an alternative arrangement of the pressure-sensitive sheet 1300 of FIG. 13 or the pressure-sensitive sheet 1800 of FIG. 18. In FIG. 26, a multi-sensor sheet 2600 is shown having a base substrate 2602 on which four pressure-sensitive sheets 2604a-d are shown. Instead of the first and second electrical connection regions being located along edges of the sheet, like in the sheet 1800, or at a hub region at an edge of the sheet, like in the sheet 1300, the first and second electrical connection regions of each sheet terminate in a multi-connection hub region 2606 located at a mid-point or central region of the base substrate 2602. As can be seen from FIG. 23, each pressure-sensitive sheet 2604a-d has its own first and second electrical connection region extending from the electrode regions of each sheet to the multi-connection hub region 2606. In other words, each sheet 2604a-d may comprise a first electrical connection region directly electrically connected to a first electrode region, and a second electrical connection region directly electrically connected to a second electrode region. Between the first and second electrode regions is a piezo-resistive ink layer, as previously described in relation to other embodiments.

The sheet 2600 of FIG. 26 may comprise two substrates, as for many of the other embodiments. A first half includes a first substrate having the first electrode region and the first electrical connection region thereon, and a second half includes a second substrate having the second electrode and the second electrical connection region thereon. On one or both of the halves, the piezo-resistive ink layer is included to cover at least the entire area of the first and second electrode when the sheet 2600 is in the assembled state (as shown in FIG. 26), such that the piezo-resistive ink layer is located between the first and second electrode regions. Importantly, in the sheet 2600 the first electrical connection region extends from the first electrode region at a first location, and the second electrical connection region extends from the second electrode region at a different, second location. In this manner, when the sheet 2600 is assembled, the first and second electrical connection regions do not overlap and cause an electrical shorting.

Alternatively, the sheet 2600 may only comprise one substrate having all of the layers thereon, For example, a single substrate may have the first electrode region and first electrical connection region as a first layer, the one or more piezo-resistive ink layers as a second layer, and the second electrode region and second electrical connection region as a third layer. Protective layers may be used on either side of the substrate, as previously described.

Such an arrangement is particularly suited to provide a self-contained, integrated multi-sensor sheet 2600 in which the system processing the data is also located on the base substrate 2602. As all the connection regions, i.e. the circuit terminals, terminate at a hub region 2606 at a central point of the sheet, the processor and other components may be conveniently connected to all of the pressure-sensitive sheets 2604a-d at the multi-connection region 2606. Therefore, the central region 2606 may comprise a processor and a power source, for example.

Although the layering of each of the four pressure-sensitive sheets 2604a-d may be the same as that of the pressure-sensitive sheet 1800, the base substrate 2602 may fill the role of the first substrate 102 of each sheet. Therefore, each pressure-sensitive sheet 2604a-d may share the base substrate 2602 as a first substrate.

Although four pressure-sensitive sheets 2604a-d are shown, any plurality of pressure-sensitive sheets may be present in the multi-sensor sheet 2600, and the multi-connection region 2606 may be located at a different region of the sheet 2600 other than the central point.

In all of the above embodiments, each first electrode region is at least partially above the second electrode region in the Z direction. This means that, for these embodiments, any pressure-sensitive ink may be used as long as it is conductive in the Z direction.

However, other inks may be used which are also or instead conductive in other directions, such as the X direction and/or the Y direction. Such inks may be termed "laterally conductive" in that they conduct electricity across their plane. Such inks have been described previously.

The use of a laterally conductive ink means that the first electrode region need not be above the second electrode region in the Z direction. Instead, the first electrode region and the second electrode region may be spaced apart in the X or Y direction, the laterally conductive ink providing an electrical bridge between the first and second electrode regions. By using such a pressure-sensitive ink in the example of the pressure-sensitive sheet 300, it would not be necessary for any layers to be printed on the second substrate 202. Instead, all layers could be printed on the first substrate 102 only as described below.

For example, the first half 100 may include the first and second electrical connection regions 108, 110, and the first and second electrode regions 104, 204. The first electrode region 104 is directly electrically connected to the first electrical connection region 108, and the second electrode region 204 is directly electrically connected to the second electrical connection region 110. In this example, the first and second electrode regions 104, 204 are spaced apart laterally such that they do not overlap. Therefore, a laterally conductive pressure-sensitive ink layer 106 may be arranged to overlap both the first electrode region 104 and the second electrode region 204 such that, when a force is applied, the lateral conductivity of the layer 106 allows the electrode regions to be used to detect a resistance change in the layer 106. The second half 200 in this example may therefore be completely absent, or may only provide a protective layer as the second substrate 202 with no other elements. In this example, the ordering of the layers on the first half 100 may be changed. For example, the pressure-sensitive ink layer 106 could be applied to the substrate 102 first, and then the layer comprising the electrical connection regions, electrode regions and tracks could be applied on top of the pressure-sensitive ink layer 106.

Alternatively however, the second half 200 may instead or additionally comprise the pressure-sensitive ink layer 106 and the second substrate 202 only, as the electrode regions are both provided on the first substrate 202.

Some laterally conductive inks are only conductive through the point of pressure and provide the opportunity of an electrical bridge within the area where the pressure and/or force is being applied. In this case, if the size of the pressure/force area is not sufficient to provide an electrical bridge between the first and second electrode regions, either an interdigitated design or variant thereof can be adopted between electrode regions and/or a conductive force actuator can be introduced providing an electrical bridge between the first and second electrode regions. Any conductive force actuator material can be used, including the object that is applying pressure onto the conductive ink, or, the object surface if conductive that the tape is adhered to, or adhesive tape that may be conductive and/or optionally with a conductive strip that may be applied to either the adhesive or the single substrate. Additionally, it may be preferred to use a dielectric layer on the first substrate if the electrodes and tracks are to come into contact with conductive surfaces.

In any of the above-described embodiments, the electrical connection regions may be adjacent to the electrode regions and be equal to, greater than or less than the length of the edge of the electrode region to which the electrical connection region is adjacent. Furthermore, the electrical connection regions may extend beyond the electrode region to a neighbouring electrode region, as already described in the sheet 700, for example, which shows electrode connection regions extending along and past the length of two electrode regions. In any of the above embodiments, electrical connection to the first and/or second electrical connection regions from other circuit elements (i.e. electrical connection to circuit terminals of the piezo-resistive sheet) may be via a cable of any kind. For example, this may be a flat flex cable, as previously described. Alternatively or in addition, a connecting sheet may be used to connect a remote system to any of the previously-described piezo-resistive sheets. The connecting sheet may comprise a substrate having conductive tracks thereon. The conductive tracks are arranged such that, when an end region of the connecting sheet is placed into contact with the first and/or second electrical connection regions, an electrical connection is formed between the conductive tracks of the connecting sheet and at least one of the circuit terminals of the piezo-resistive sheet. The remote system, responsible for processing the detected resistance change of the piezo-resistive sheet, may therefore be connected to an opposite end region of the connecting sheet in order to provide an electrical connection between the piezo-resistive sheet and the remote system. Although end regions of the connecting sheet have been described, any two discrete points along the connecting sheet may be used to connect to the piezo-resistive sheet to the remote system.

Much like the piezo-resistive sheets described herein, the substrate of the connecting sheet may be flexible and the conductive tracks may be printed thereon. Alternatively, the conductive tracks may be adhered to the connecting sheet using an adhesive. An electrically conductive adhesive may be used between the conductive tracks of the connecting sheet and one or more circuit terminals of the piezo-resistive sheet to both adhere the two together, and provide a secure electrical connection. Any electrically conductive adhesive as previously described may be used.

As an alternative, the connecting sheet could be an extension of, and integral with, the piezo-resistive sheet itself, thereby providing a "tail" for extending one or more of the circuit terminals away from the sensors of the piezo-resistive sheet.

Although various sheets, substrates, electrode regions and pressure-sensitive ink layers have been described as being substantially rectangular or square, any shape may be used as appropriate in any of the above embodiments. For example, the electrode regions could be circular or polygonal, and may have radiused edges. As would be understood, the specific shapes described herein are for illustrative purposes only, and many different shapes may be used depending on the specific use of the sheet in question.

A plurality of the piezo-resistive sheets of any of the above embodiment may be provided on a larger array sheet and peelable such that individual piezo-resistive sheets can be removed from the array sheet and used as necessary. Each piezo-resistive sheet may be printed onto the array sheet, the adhesive being chosen in such a manner to allow removal of each piezo-resistive sheet by peeling. Square or rectangular piezo-resistive sheets are particularly suitable to be arranged on the array sheet due to the ease of placement and space efficiency.

The array sheet may arrange the piezo-resistive sheets into rows and columns, and the rows and columns may be heterogeneous in their force detection properties. For example, each piezo-resistive sheet of a first column may be arranged to detect a first force range, and each piezo-resistive sheet of a second column may be arranged to detect a second force range different from the first force range. Of course, any arrangement may be used such that the array sheet provides a plurality of piezo-resistive sheets arranged to detect a plurality of different force ranges.

Instead of or in addition to the protective layer of the previously-described piezo-resistive sheets, there may be a second object placed on top of the piezo-restive sheet so as to sandwich the sheet between two objects. This may involve adding an adhesive to a top surface of the piezo-restive sheet to adhere the second object thereto.

Although all of the above embodiments have described a pressure-sensitive sheet in which at least conductive tracks or a pressure-sensitive ink layer are applied to a substrate, it may be the case that one or both of these layers are applied directly to the object. For example, a method of forming a pressure-sensitive sheet, having the same functionality as the pressure-sensitive sheet 300, may comprise forming the first half 100 directly onto the object instead of onto the first substrate 102. For example, the method comprises forming a first layer providing: the first electrode region 104, the first connection region 108, the one or more conductive tracks between the first electrode region 104 and the first connection region 108, the second connection region 110, and optionally the tab regions 112 onto an object. The method further comprises forming a second layer providing a piezoresistive ink layer 106 on top of the first electrode region 104. The object, in this case, being the object to which a force will be applied.

The second half 200 may then be adhered to the object, on top of the layers formed thereon, to create an equivalent of the pressure-sensitive sheet 300 without the first substrate 102. In short, in any of the above embodiments, the first half 100, 500, 800, 1100, 1300, 1600 may be printed directly onto the object without any first substrate. A pressure-sensitive sheet is therefore formed directly onto the object.

Conversely, instead of the first half (without the first substrate) being formed on the object, the second half of any of the above embodiments could be printed directly onto the object without any second substrate. The corresponding first half could then be adhered to the object, on top of the layers of the second half.

In the case of the pressure-sensitive sheet having a laterally conductive ink, and the first and second electrodes 104, 204 therefore being spaced apart, all elements of the pressure-sensitive sheet could be formed directly on the object. For example, a method of forming a pressure-sensitive sheet may comprise forming a first layer providing: the first electrode region 104, the first electrical connection region 108, the one or more conductive tracks between the first electrode region 104 and the first connection region 108, the second electrode region 204, the one or more conductive tracks between the second electrode region 204 and the second connection region 110, the second electrode region 204 being laterally spaced apart from the first electrode region 104. Then, the method continues by forming a second layer providing the laterally conductive pressure-sensitive ink layer 106 overlapping both the first electrode 104 and the second electrode 204. However, the ordering of the first layer and the second layer may be reversed. In other words, either the first layer or the second layer may be the layer directly applied to the object.

As previously described, when a force is applied, the lateral conductivity of the layer 106 allows the electrode regions to be used to detect a resistance change in the layer 106. The second substrate 202 may then optionally be applied on top of the formed layers to provide a protective layer.

In these methods, any and all elements of the first half or second half may be applied directly to the object, avoiding the need for the corresponding first or second substrate.

As previously described, the layer providing the electrode regions, tracks and electrical connection regions may be a printable conductive ink, such as silver or any of the others previously described. The pressure-sensitive ink layer may also be a printable ink as previously described.

In the case that the object to which the layers are directly applied is a non-conductive object, then the layers may be applied as previously described. However, in the case that the object is electrically conductive, such as a metal object, there are various options. One option is to apply an insulating layer before applying any other layers. The insulating layer creates an area on top of the object that is non-conductive, ensuring no electrical shorting. Alternatively, the object itself can provide the function of the electrode regions, tracks and electrical connection regions, and an insulating layer can be applied as a first step to mark-out the boundaries of these regions. Alternatively, a process can be applied to remove conductive material from the object to mark-out the boundaries, such as by laser ablation. Then, the piezo-resistive layer 106 can be applied to overlap the regions of the object marked-out as the electrode regions, connection regions and tracks.

Waterproofing and/or hermetically sealing layers may be provided to any of the sheets as is necessary. Examples include welding, sonic and/or heat sealing. The lamination process may include evacuation to remove air.

In any of the described embodiments, any or all of the processor, power source or other circuit elements may be integral with the pressure-sensitive sheet. This circuitry may include wireless communication elements for sending data from the pressure-sensitive sheet to a remote device. To reduce complexity, such wireless communication elements may communicate passively, such as via RFID by using an embedded antenna.

In addition, the pressure-sensitive sheets may include temperature and/or humidity sensors. Movement sensors may also be included, such as a gyrometer and/or accelerometer, which may also be integral with the pressure-sensitive sheet.

In any of the described embodiments comprising multiple sensors, the sensors may be connected on an individual basis, or may be in series or parallel with other sensors. The exact connection of multiple sensors is determined based on the intended use.

In any of the described embodiments, piezo-resistive paste may be used instead of piezo-resistive ink.

Any of the pressure-sensitive sheets described herein may be used as part of a system in which some of the elements of the sheet are on one object, and certain other elements of the sheet are on a different object. As such two objects, when the corresponding elements thereon are in physical contact, together form the pressure-sensitive sheet. For example, a first object may have a first region comprising a first plurality of elements selected from a group consisting of: a first electrical connection region, first electrode region, a second electrical connection region, a second electrode region, a pressure-sensitive layer. A second object may then have a second region comprising a second plurality of elements selected from that same group, the second plurality of elements being different from the first plurality of element such that, together, they form the pressure-sensitive sheet. In this example, when the first region impacts the second region, the pressure-sensitive sheet is effectively formed in that moment in time and may be used to record the impact force. An example use of this system may be in a manufacturing facility in which the first region is found on an object being manufactured, and the second region is found on manufacturing machinery. It is therefore possible to specifically monitor impact regions between corresponding objects in any environment.

The ability for the sheets to be part of a modular system allows for multiple options for providing a sheet-based data source and the use of such data. Data may be extracted from individual lengths of tape/sheet or discrete sheets, or alternatively as a single data source from a combination of modular tape or sheet arrangements. The described sheets and tapes of the different embodiments described above may also be combined and connected together.

The data captured from a single tape/sheet or the modular combination of tapes/sheets may include resistance, resistance change, force, force alert (on/off switch), location, time, date, duration and the force profile captured over a time period with high levels of specificity in terms of sampling rate and force range. Resistance measurements may also be converted to pressure, strain, tension and/or weight data by way of example. The data may be collected and/or stored on a per sheet basis, or a per sensor or sensor group basis, depending on the sheet used and the need. These data elements may be used alone or together and in combination with other sensor and external data sources to create new types of derived data. This derived data may be made available either directly at the first point of digital data capture (PCB), or using other digital devices. Such digital devices may be connected using wired connections or using other forms of data communications methods e.g. BLE or wi-fi, to access a variety of data sources such as server or cloud hosted databases, open data and third-party APIs and other types of data exchange protocols. A system may be provided comprising one or more of the pressure-sensitive sheets previously described, the system being arranged to: receive data indicative of a change in electrical resistance of the pressure-sensitive sheet; and determine a value of the force applied to the object based on the change in electrical resistance of the pressure-sensitive sheet. That value of the force may then be output, for example to a display device.

These arrangements allow the tape/sheet sensors to enable a multitude of data analytics outputs which may be supplemented by machine learning, neural networks and related AI algorithms to provide critical force data to support a range of consumer and industrial applications. It is therefore possible to create new data points and gather data in a way that was not previously possible with existing technology, primarily because the described pressure-sensitive sheets provide the possibility to adapt almost any surface to be force/pressure detecting, allowing surfaces that cannot currently be considered as data acquisition points to be data acquisition points.

The various functions of any of the pressure-sensitive sheets or modular systems described above may be implemented by a computer program product. The software resident on a memory that captured the data is an example of such a computer program product. The computer program product may include computer code arranged to instruct a computer or the processor to perform the functions described above. The computer program and/or the code for performing such functions may be provided to an apparatus, such as a computer or the processor, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or the pressure-sensitive sheet/modular system may be configured in accordance with such code to perform one or more processes in accordance with the various functions discussed herein. In one arrangement, the apparatus comprises a processor, memory, and optionally a display. Typically, these are connected to a central bus structure, the display being connected via a display adapter. The system can also comprise one or more input devices (such as a mouse, keyboard or touchscreen) and/or a communications adapter for connecting the apparatus to other apparatus or networks. In one arrangement, a database resides in the memory of the computer system. Such an apparatus may take the form of a data processing system. Such a data processing system may be a distributed system. For example, such a data processing system may be distributed across a network.

The invention claimed is:

1. A pressure-sensitive sheet for detecting a force applied to an object, the pressure-sensitive sheet comprising:
   a first substrate having a first electrical connection region and a first electrode region thereon, the first electrical connection region being electrically connected to the first electrode region;
   a second electrode region physically separated from the first electrode region;
   a second electrical connection region electrically connected to the second electrode region; and
   a pressure-sensitive layer arranged between the first electrode region and the second electrode region to provide an electrical connection therebetween, the pressure-sensitive layer being arranged to change electrical resistance in response to pressure changes,
   wherein the first electrical connection region and the second electrical connection region are arranged to provide circuit terminals of the first electrode and the second electrode, respectively, and
   wherein at least part of the first electrical connection region or the second electrical connection region is left exposed to allow direct electrical contact with a first or second electrical connection region of another pressure-sensitive sheet.

2. The pressure-sensitive sheet of claim 1, further comprising a second substrate, wherein the first electrode region and the second electrode region are located between the first substrate and the second substrate.

3. The pressure-sensitive sheet of claim 2, wherein the second electrical connection region is located on the first substrate and the second electrode region is located on the second substrate, the second electrical connection region being electrically connected to the second electrode region.

4. The pressure-sensitive sheet of claim 2, wherein the second electrical connection region comprises a tab region positioned to electrically connect with a corresponding tab region of the second electrode region.

5. The pressure-sensitive sheet of claim 2, wherein the first electrical connection region comprises a plurality of first subregions, the second electrical connection region comprises a plurality of second subregions, and the first electrode region comprises a plurality of first electrode regions, wherein at least one of the first subregions is associated with a first group of the first electrode regions, and wherein at least one of the second subregions is associated with a second group of the first electrode regions, at least some of the first electrodes regions of the first group being different from the first electrode regions of the second group.

6. The pressure-sensitive sheet of claim 1, wherein the first electrical connection region or the second electrical connection region is arranged to be electrically connected to one of a first or second electrical connection region of another of the pressure-sensitive sheet.

7. The pressure-sensitive sheet of claim 1, further comprising a second substrate having the second electrode region thereon, the first electrode region and the second electrode region being located between the first substrate and the second substrate, wherein the first substrate has the second electrical connection region thereon, and wherein the second electrode region is electrically connected to the second electrical connection region via a first tab region located on the second substrate.

8. The pressure-sensitive sheet of claim 7, wherein the second electrical connection region comprises a second tab region corresponding to the first tab region of the second substrate, the first tab region being electrically connected to, and overlapping with, the second tab region.

9. The pressure-sensitive sheet of claim 1, wherein the first electrical connection region and the second electrical connection region are arranged along different edge regions of the pressure-sensitive sheet.

10. The pressure-sensitive sheet of claim 9, wherein the different edge regions are first and second edge regions, the first electrical connection region being located along the first edge region and the second electrical connection region being located along the second edge region.

11. The pressure-sensitive sheet of claim 9, wherein the pressure-sensitive sheet is an elongate strip or tape, the different edge regions being located along a length of the elongate strip or tape.

12. The pressure-sensitive sheet of claim 9, wherein the pressure-sensitive sheet is a substantially rectangular sheet, the different edge regions being located along different edges of the rectangular sheet.

13. A roll comprising:
a plurality of pressure-sensitive sheets, at least one sheet among the plurality of pressure-sensitive sheets including:
a first substrate having a first electrical connection region and a first electrode region thereon, the first electrical connection region being electrically connected to the first electrode region;
a second electrode region physically separated from the first electrode region;
a second electrical connection region electrically connected to the second electrode region; and
a pressure-sensitive layer disposed between the first electrode region and the second electrode region to provide an electrical connection therebetween, the pressure-sensitive layer being arranged to change electrical resistance in response to pressure changes,
wherein the first electrical connection region and the second electrical connection region are arranged to provide circuit terminals of the first electrode and the second electrode respectively, and
wherein at least part of the first electrical connection region or the second electrical connection region is left exposed to allow direct electrical contact with a first or second electrical connection region of another sheet of the plurality of pressure-sensitive sheets.

14. A modular system comprising:
a first pressure-sensitive sheet comprising:
a first substrate having a first electrical connection region and a first electrode region thereon, the first electrical connection region being electrically connected to the first electrode region;
a second electrical connection region and a second electrode region, the second electrical connection region being electrically connected to the second electrode region, the second electrode region being physically separated from the first electrode region; and
a first pressure-sensitive layer disposed between the first electrode region and the second electrode region to provide an electrical connection therebetween, the first pressure-sensitive layer being arranged to change electrical resistance in response to pressure changes,
wherein the first electrical connection region and the second electrical connection region are arranged along different edge regions of the pressure-sensitive sheet to provide circuit terminals of the first electrode and the second electrode respectively; and
a second pressure-sensitive sheet comprising:
a second substrate having a third electrical connection region and a third electrode region thereon, the third electrical connection region being electrically connected to the third electrode region;
a fourth electrical connection region and a fourth electrode region, the fourth electrical connection region being electrically connected to the fourth electrode region, the fourth electrode region being physically separated from the third electrode region; and
a second pressure-sensitive layer disposed between the third electrode region and the fourth electrode region to provide an electrical connection therebetween, the second pressure-sensitive layer being arranged to change electrical resistance in response to pressure changes,
wherein the third electrical connection region and the fourth electrical connection region are arranged along different edge regions of the pressure-sensitive sheet to provide circuit terminals of the first electrode and the second electrode respectively,
wherein one of the first or second electrical connection regions of the first pressure-sensitive sheet overlaps with one of the first third or fourth electrical connection region of the second pressure-sensitive sheet, wherein at least part of the first electrical connection region or the second electrical connection region of the first pressure-sensitive sheet is left exposed such that the first electrical connection region or the second electrical connection region of the first pressure-sensitive sheet is configured to be in direct electrical contact with the third or fourth electrical connection region of the second pressure-sensitive sheet.

* * * * *